Figure 1:
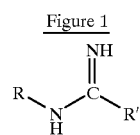

US006008316A

United States Patent [19]
Foster, Jr. et al.

[11] Patent Number: 6,008,316
[45] Date of Patent: Dec. 28, 1999

[54] FUNCTIONALIZED POLYAMINES

[75] Inventors: Alvie L. Foster, Jr.; Ivonne C. Weidner, both of Chattanooga; Klein A. Rodrigues, Signal Mountain; Allen M. Carrier, Hixson, all of Tenn.

[73] Assignee: National Starch and Chemical Investment Holding Corporation, Wilmington, Del.

[21] Appl. No.: 09/146,873

[22] Filed: Sep. 3, 1998

[51] Int. Cl.[6] ........................ C08G 12/00; D06M 13/256
[52] U.S. Cl. .......................... 528/229; 528/220; 252/8.6; 510/529
[58] Field of Search .............................. 252/8.6; 510/529; 528/220, 229

[56] References Cited

U.S. PATENT DOCUMENTS

| | | | |
|---|---|---|---|
| 2,622,075 | 12/1952 | Hemmi et al. | 260/77.5 |
| 3,909,200 | 9/1975 | Redmore | 21/2.7 R |
| 4,059,687 | 11/1977 | Bauman | 424/54 |
| 4,314,808 | 2/1982 | Jacquet et al. | 8/405 |
| 4,634,544 | 1/1987 | Weber et al. | 252/99 |
| 4,637,821 | 1/1987 | Monnais et al. | 8/415 |
| 4,670,592 | 6/1987 | Eakin et al. | 564/234 |
| 5,041,655 | 8/1991 | Huthmacher et al. | 564/106 |
| 5,260,385 | 11/1993 | Lio | 525/328.2 |
| 5,380,447 | 1/1995 | Kirk et al. | 252/8.6 |
| 5,534,182 | 7/1996 | Kirk et al. | 8/137 |
| 5,698,476 | 12/1997 | Johnson et al. | 442/121 |
| 5,710,118 | 1/1998 | Busch et al. | 510/360 |

FOREIGN PATENT DOCUMENTS

| | | | |
|---|---|---|---|
| 0 753 570 A2 | 1/1997 | European Pat. Off. | C11D 3/37 |
| 0 767 191 A2 | 9/1997 | European Pat. Off. | C08G 73/06 |
| WO 97/42285 | 11/1997 | WIPO | C11D 3/37 |
| WO 97/42286 | 11/1997 | WIPO | C11D 3/37 |

OTHER PUBLICATIONS

Dunbar, Nader, Gerwick, Hedstrad, Woo and Bass, "Synthesis and herbicidal Activity of Some Novel Cyanoguanidines and Related Cyanoisothioureas", *J. Agric. Food Chem.* 1989, 37, 809–814 Month Not Available.

East, McIntyre and Shao, "Polybiguanides: synthesis and characterization of polybiguanides containing hexamethylene groups", Polymer vol. 38, Num. 15, 1997, pp. 3973–3984 Month Not Available.

*Primary Examiner*—P. Hampton-Hightower
*Attorney, Agent, or Firm*—John D. Thallemer

[57] ABSTRACT

A functionalized polyamine comprising the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine, provided that the monomeric amine and the cyano- or guanidino-containing compound are present in the functionalized polyamine in a molar ratio of from 1.1:1 to 100:1, respectively. The functionalized polyamines are especially useful as anti-dye transfer and color protection agents in laundry detergent compositions.

5 Claims, No Drawings

FUNCTIONALIZED POLYAMINES

FIELD OF THE INVENTION

The present invention relates to a functionalized polyamine and a method for making same. The functionalized polyamines are useful as anti-dye transfer and color protection agents in detergent compositions.

BACKGROUND OF THE INVENTION

One of the most persistent and troublesome problems arising during modern fabric laundering operations is the tendency of some colored fabrics to release dye into the laundering solutions. The dye is then transferred onto other fabrics being washed therewith. Another problem is the undesired removal of dyes, causing the premature fading of the fabric, thereby reducing the fabric aesthetic qualities.

One way of overcoming the first problem would be to complex or adsorb the fugitive dyes washed out of dyed fabrics before they have the opportunity to become attached to other articles in the wash. This is termed anti-dye transfer. A solution to the second problem would be to minimize or prevent the desorption of dyes from the fabric during the laundering process. This is termed color protection.

Polymers have been used in detergent compositions to inhibit dye transfer. One type of such polymers are N-vinylimidazole homo- and copolymers. Examples of said polymers are described in DE 2 814 287-A which describes detergent compositions containing N-vinyl imidazole homo- or copolymer in combination with anionic and/or nonionic surfactants and other detergent ingredients. EP 372 291 describes a process for washing discoloration-sensitive textiles. The wash liquor contains anionic/nonionic surfactants and water soluble polymers, for example, copolymers N-vinylimidazole, N-vinyloxazolidone or N-vinylpyrrolidone. EP 327 927 describes a granular detergent additive comprising water-soluble polymeric compounds based on N-vinylpyrrolidone and/or N-vinylimidazole and/or N-vinyloxazolidone and cationic compounds. DE 4 027 832-A describes electrolyte-free liquid detergent compositions comprising zeolite A, nonionic surfactants and dye transfer inhibiting polymers. The dye transfer inhibiting polymers are homo- and copolymers selected from N-vinylpyrrolidone and/or N-vinylimidazole and/or N-vinyloxazolidone.

Biguanidine polymers have been successfully employed in a variety of applications. For example, U.S. Pat. No. 5,260,385 describes biguanidine polymers containing a multiplicity of biguanide groups for use as a germicide or antimicrobial. U.S. Pat. No. 3,909,200 describes corrosion inhibitors formed by reacting guanidine-type compounds with polyamines.

To one skilled in the art it is known that the overall cleaning performance of detergent compositions formulated with color protection polymers is adversely impacted with respect to stain removal and soil redeposition. Therefore, it would be advantageous to develop a polymer which provides anti-dye transfer and color protection properties to detergent formulations without adversely affecting the overall detergent performance.

SUMMARY OF THE INVENTION

Accordingly, it is an object of the invention to provide a polymer which is effective in eliminating transfer of solubilized or suspended dyes while not adversely affecting the overall detergent performance.

It is another object of the invention to provide a polymer which exhibits anti-dye transfer properties without inhibiting removal of stains from fabrics which are washed in the presence of the polymer.

It is also an object of the invention to provide a polymer which inhibits the removal of dyes from colored fabric without adversely effecting stain removal.

It is a further object of the invention to provide a biguanidine polymer and a method of making same for use in detergent compositions.

With regard to the foregoing and other objects, the invention provides a functionalized polyamine comprising the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine, provided that the monomeric amine and the cyano- or guanidino-containing compound are present in the functionalized polyamine in a molar ratio of from 1.1:1 to 100:1, respectively, wherein the functionalized polyamine has the structure

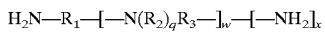

wherein $R_1$ is selected from the group consisting of $C_1$–$C_{20}$ alkyl, aryl, alkaryl, and —$(CH_2CHXO)_p$—; X is selected from the group consisting of hydrogen, methyl, ethyl, propyl, phenyl, OH, and OX'; X' is selected from the group consisting of $C_1$–$C_{20}$ alkyl, aryl, and alkaryl; $R_2$ is selected from the group consisting of hydrogen, $C_1$–$C_{20}$ alkyl, aryl, alkaryl, —$(CH_2CHXO)_p$—, —$R_7$—[—$N(R_8)_rR_9$—]$_y$—[—$NH_2$]$_z$, and —C=$NHY_1(NY_2Y_3)$—; $R_3$ is selected from the group consisting of hydrogen, $C_1$–$C_{20}$ alkyl, aryl, alkaryl, —$(CH_2CHXO)_p$—, —$R_4R_5N$—$R_6$—, $R_{13}$—[—N$(R_{14})_sR_{15}$—]$_a$—[—$NH_2$]$_b$ and —C=$NHY_7(NY_8Y_9)$—; $R_4$ is selected from the group consisting of $C_1$–$C_4$ alkyl, alkoxy, and alkamine; $R_5$ is selected from the group consisting of $C_1$–$C_4$ alkyl, alkoxy, and alkamine; $R_6$ is selected from the group consisting of hydrogen, $C_1$–$C_{20}$ alkyl, aryl, alkaryl, and —$(CH_2CHXO)_p$—, and —C=$NHY_7(NY_8Y_9)$—; $R_7$ is selected from the group consisting of $C_1$–$C_{20}$ alkyl, aryl, alkaryl, and —$(CH_2CHXO)_p$—; $R_8$ is selected from the group consisting of hydrogen, $C_1$–$C_{20}$ alkyl, aryl, alkaryl, —$(CH_2CHXO)_p$—, and —C=$NHY_1(NY_2Y_3)$—; $R_9$ is selected from the group consisting of hydrogen, $C_1$–$C_{20}$ alkyl, aryl, alkaryl, —$(CH_2CHXO)_p$—, —$R_{10}R_{11}N$—$R_{12}$—, and —C=$NHY_7(NY_8Y_9)$—; $R_{10}$ is selected from the group consisting of $C_1$–$C_4$ alkyl, alkoxy, and alkamine; $R_{11}$ is selected from the group consisting of $C_1$–$C_4$ alkyl, alkoxy, and alkamine; $R_{12}$ is selected from the group consisting of hydrogen, $C_1$–$C_{20}$ alkyl, aryl, alkaryl, and —$(CH_2CHXO)_p$—, and —C=$NHY_7(NY_8Y_9)$—; $R_{13}$ is selected from the group consisting of $C_1$–$C_{20}$ alkyl, aryl, alkaryl, and —$(CH_2CHXO)_p$—; $R_{14}$ is selected from the group consisting of hydrogen, $C_1$–$C_{20}$ alkyl, aryl, alkaryl, —$(CH_2CHXO)_p$—, and —C=$NHY_1(NY_2Y_3)$—; $R_{15}$ is selected from the group consisting of hydrogen, $C_1$–$C_{20}$ alkyl, aryl, alkaryl, —$(CH_2CHXO)_p$—, —$R_{16}R_{17}N$—$R_{18}$—, and —C=$NHY_7(NY_8Y_9)$—; $R_{16}$ is selected from the group consisting of $C_1$–$C_4$ alkyl, alkoxy, and alkamine; $R_{17}$ is selected from the group consisting of $C_1$–$C_4$ alkyl, alkoxy, and alkamine; $R_{18}$ is selected from the group consisting of hydrogen, $C_1$–$C_{20}$ alkyl, aryl, alkaryl, and —$(CH_2CHXO)_p$—, and —$C=NHY_7(NY_8Y_9)$—; $Y_1$ is a dissociated acid; $Y_2$ is selected from the group consisting of hydrogen, $C_1$–$C_{20}$ alkyl, aryl, alkaryl, and —$(CH_2CHXO)_p$—; $Y_3$ is selected from the group consisting of hydrogen, $C_1$–$C_{20}$ alkyl, aryl, alkaryl, —$(CH_2CHXO)_p$—, —$C=NHY_4(NY_5Y_6)$—, and nitrile (—$C:::N$); $Y_4$ is a dissociated acid; $Y_5$ is selected from the group consisting of hydrogen, $C_1$–$C_{20}$ alkyl, aryl, alkaryl, and —$(CH_2CHXO)_p$—; $Y_6$ is selected from the group consisting of hydrogen, $C_1$–$C_{20}$ alkyl, aryl, alkaryl, and —$(CH_2CHXO)_p$—; $Y_7$ is a dissociated acid; $Y_8$ is selected from the group consisting of hydrogen, $C_1$–$C_{20}$ alkyl, aryl, alkaryl, and —$(CH_2CHXO)_p$—; $Y_9$ is selected from the group consisting of hydrogen, $C_1$–$C_{20}$ alkyl, aryl, alkaryl, —$(CH_2CHXO)_p$—, —$C=NHY_{10}(NY_{11}Y_{12})$—, and nitrile (—$C:::N$); $Y_{10}$ is a dissociated acid; $Y_{11}$ is selected from the group consisting of hydrogen, $C_1$–$C_{20}$ alkyl, aryl, alkaryl, and —$(CH_2CHXO)_p$—; $Y_{12}$ is selected from the group consisting of hydrogen, $C_1$–$C_{20}$ alkyl, aryl, alkaryl, and —$(CH_2CHXO)_p$—; a is 1 to 5,000; b is 0 or 1; p is 1 to 6; q is 0 or 1; r is 0 or 1; s is 0 or 1; w is 1 to 5,000; x is 0 or 1; y is 1 to 5,000; z is 0 or 1; with the following provisos: if $R_2$ and $R_3$ are hydrogen, then x is 0; if $R_8$ and $R_9$ are hydrogen, then z is 0; if $R_{14}$ and $R_{15}$ are hydrogen, then b is 0; if q is 0, then $R_3$ is —$R_4R_5N$—$R_6$—; if r is 0, then $R_9$ is —$R_{10}R_{11}N$—$R_{12}$—; if s is 0, then $R_{15}$ is —$R_{16}R_{17}N$—$R_{18}$—; if $R_6$ is hydrogen, then x is 0; if $R_{12}$ is hydrogen, then z is 0; if $R_{18}$ is hydrogen, then b is 0; if $R_2$ is present, then $R_3$ is selected from the group consisting of $C_1$–$C_{20}$ alkyl, aryl, alkaryl, —$(CH_2CHXO)_p$—, $R_{13}$—[—$N(R_{14})_sR_{15}$—]—$_a$—[—$NH_2$]$_b$, and —$C=NHY_7(NY_8Y_9)$—; if $R_8$ is present, then $R_9$ is selected from the group consisting of $C_1$–$C_{20}$ alkyl, aryl, alkaryl, and —$(CH_2CHXO)_p$—, and —$C=NHY_7(NY_8Y_9)$—; if $R_{14}$ is present, then $R_{15}$ is selected from the group consisting of $C_1$–$C_{20}$ alkyl, aryl, alkaryl, and —$(CH_2CHXO)_p$—, and —$C=NHY_7(NY_8Y_9)$—; if $Y_8$ and $Y_9$ are hydrogen, then at least one of b, x, and z is 0; and if $Y_{11}$ and $Y_{12}$ are hydrogen, then at least one of b, x, and z is 0. According to another aspect the invention provides a functionalized polyamine as described above wherein the cyano- or guanidino-functional groups are attached to the polyamine by means of covalent bonds formed by a reaction between at least one nitrile or imine carbon on the cyano- or guanidino-containing compound and at least one nitrogen on the polyamine.

A preferred functionalized polyamine according to the present invention has the following structure:

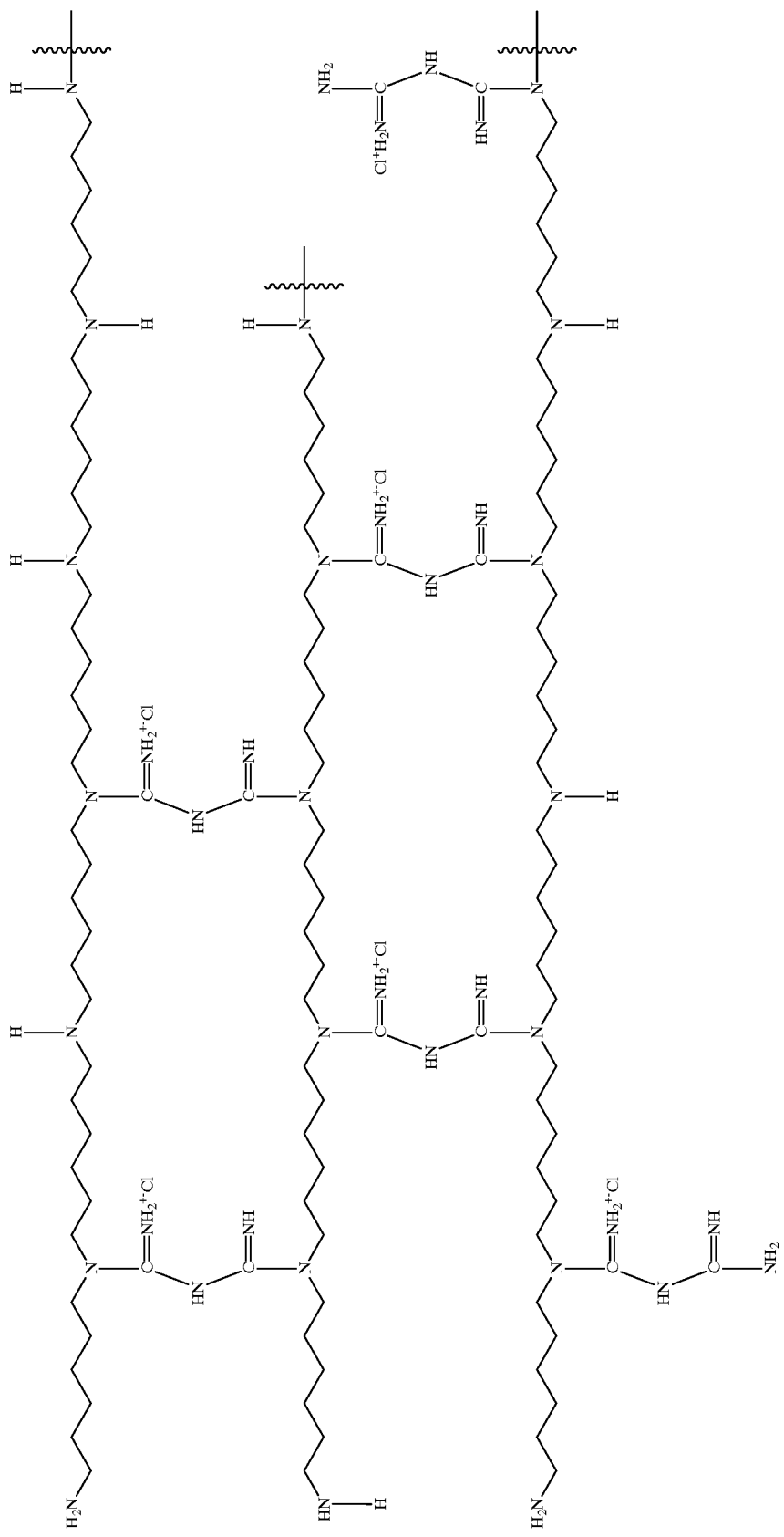

In a preferred embodiment, the functionalized polyamine has a linear backbone, wherein $R_2$ is hydrogen; $R_3$ is selected from the group consisting of hydrogen, $C_1$–$C_{20}$ alkyl, aryl, alkaryl, —$(CH_2CHXO)_p$—, —$R_4R_5N$—$R_6$—, $R_{13}$—[—$N(R_{14})_sR_{15}]_a$—[—$NH_2]_b$ and —C=$NHY_7(NY_8Y_9)$—. More preferably, $R_1$ and $R_3$ are independently hexamethylene, 2-methylpentamethylene, or biguanidine groups, with the majority of the groups being hexamethylene and 2-methylpentamethylene. $R_2$ is hydrogen, q is 1, and w is from about 2 to about 100.

In another preferred embodiment, the polyamine has a linear backbone which incorporates cyclic and acyclic moieties, wherein the cyclic moiety of the polyamine is defined when q is 0; $R_3$ is —$R_4R_5N$—R—, provided that if $R_6$ is hydrogen, then x is 0; and the acyclic moiety of the polyamine is defined when q is 1; $R_2$ is hydrogen; and $R_3$ is selected from the group consisting of hydrogen, $C_1$–$C_{20}$ alkyl, aryl, alkaryl, —$(CH_2CHXO)_p$—, and —C=$NHY_7(NY_8Y_9)$—, providing that if $R_2$ and $R_3$ are hydrogen, then x is 0; if $Y_8$ and $Y_9$ are hydrogen, then x is 0; if $Y_{11}$ and $Y_{12}$ are hydrogen, then x is 0. More preferably, $R_4$ and $R_5$ are ethylene, $R_1$, $R_3$, and $R_6$ are independently hexamethylene, 2-methylpentamethylene, or biguanidine groups, with the majority of the groups being hexamethylene and/or 2-methylpentamethylene; w is from about 2 to about 100.

In an additional preferred embodiment, the polyamine is multiply branched wherein $R_2$ is selected from the group consisting of $C_1$–$C_{20}$ alkyl, aryl, alkaryl, —$(CH_2CHXO)_p$—, —$R_7$—[—$N(R_8)_rR_9$—$]_y$—[—$NH_2]_z$, and —C=$NHY_1(NY_2Y_3)$—; $R_3$ is selected from the group consisting of $C_1$–$C_{20}$ alkyl, aryl, alkaryl, —$(CH_2CHXO)_p$—, —$R_4R_5N$—$R_6$—, $R_{13}$—[—$N(R_{14})_sR_{15}$—$]_a$—[—$NH_2]_b$ and —C=$NHY_7(NY_8Y_9)$—, and q is 1.

According to another aspect the invention provides a laundry detergent composition comprising a functionalized polyamine wherein the functionalized polyamine inhibits dye transfer and provides color protection in detergent compositions.

According to a further aspect the invention provides a process for inhibiting dye transfer from one fabric to another of solubilized and suspended dyes encountered during fabric laundering operations involving colored fabrics, said process comprises contacting fabrics with a laundering solution comprising the functionalized polyamine.

According to a further aspect the invention provides a process for inhibitng the release of dyes from colored fabrics encountered during fabric laundering operations involving colored fabrics, said process comprises contacting fabrics with a laundering solution comprising the functionalized polyamine.

The functionalized polyamines of this invention inhibit dye transfer and provide color protection in detergent formulations. The functionalized polyamines do not interfere with the removal of stains from fabrics washed in the presence of the functionalized polyamine. The functionalized polyamines are compatible in liquid detergent formulations. In addition, the functionalized polyamines of this invention inhibit dye transfer and provide color protection in fabric softener formulations.

DESCRIPTION OF THE INVENTION

This invention provides novel functionalized polyamines. The functionalized polyamines are especially useful as anti-dye transfer and color protection agents in detergent compositions. The functionalized polyamine comprises the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine.

The monomeric amine and the cyano- or guanidino-containing compound are present in the functionalized polyamine in a molar ratio of from 1.1:1 to 100:1 respectively. Preferably, the molar ratio of the monomeric amine and the cyano- or guanidino-containing compound is from 1.5:1 to 20:1, more preferably from 2:1 to 6:1. The backbone of the functionalized polyamine can be linear or cyclic and may contain funcfionalized polyamine branching chains which also may be linear or cyclic and which may contain branching units, etc.

The functionalized polyamine has the structure

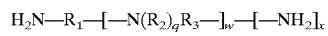

wherein $R_1$ is selected from the group consisting of $C_1$–$C_{20}$ alkyl, aryl, alkaryl, and —$(CH_2CHXO)_p$—. Preferably $R_1$ is a hexamethylene or 2-methyl-pentamethylene group. X is selected from the group consisting of hydrogen, methyl, ethyl, propyl, phenyl, OH, and OX'. X' is selected from the group consisting of $C_1$–$C_{20}$ alkyl, aryl, and alkaryl. $R_2$ is selected from the group consisting of hydrogen, $C_1$–$C_{20}$ alky, aryl, alkaryl, —$(CH_2CHXO)_p$—, —$R_7$—[—$N(R_8)_rR_9$—$]_y$—[—$NH_2]_z$, and —C=$NHY_1(NY_2Y_3)$—. Preferably $R_2$ is selected from hydrogen, hexamethylene or 2-methyl-pentamethylene group. $R_3$ is selected from the group consisting of hydrogen, $C_1$–$C_{20}$ alkyl, aryl, alkaryl, —$(CH_2CHXO)_p$—, —$R_4R_5N$—$R_6$—, $R_{13}$—[—$N(R_{14})_sR_{15}$—$]_a$—[—$NH_2]_b$ and —C=$NHY_7(NY_8Y_9)$—. Preferably $R_3$ is a hexamethylene or 2-methyl-pentamethylene group. $R_4$ is selected from the group consisting of $C_1$–$C_4$ alkyl, alkoxy, and alkamine. Preferably $R_4$ is a ethyl, dimethylamino or dimethyloxy group. $R_5$ is selected from the group consisting of $C_1$–$C_4$ alkyl, alkoxy, and alkamine. Preferably $R_5$ is a ethyl, dimethylamino or dimethyloxy group. $R_6$ is selected from the group consisting of hydrogen, $C_1$–$C_{20}$ alkyl, aryl, alkaryl, and —$(CH_2CHXO)_p$—, and —C=$NHY_7(NY_8Y_9)$—. Preferably $R_6$ is a hexamethylene, 2-methyl-pentamethylene, or biguanidine group. $R_7$ is selected from the group consisting of $C_1$–$C_{20}$ alkyl, aryl, alkaryl, and —$(CH_2CHXO)_p$—. Preferably $R_7$ is a hexamethylene or 2-methyl-pentamethylene group. $R_8$ is selected from the group consisting of hydrogen, $C_1$–$C_{20}$ alkyl, aryl, alkaryl, —$(CH_2CHXO)_p$—, and —C=$NHY_1(NY_2Y_3)$—. Preferably $R_8$ is selected from a hydrogen, hexamethylene, 2-methyl-pentamethylene, or biguanidine group. $R_9$ is selected from the group consisting of hydrogen, $C_1$–$C_{20}$ alkyl, aryl, alkaryl, —$(CH_2CHXO)_p$—, —$R_{10}R_{11}N$—$R_{12}$—, and —C=$NHY_7(NY_8Y_9)$—. Preferably $R_9$ is a hydrogen, hexamethylene, 2-methyl-pentamethylene, or biguanidine group.

$R_{10}$ is selected from the group consisting of $C_1$–$C_4$ alkyl, alkoxy, and alkamine. Preferably $R_{10}$ is a ethyl, dimethylamino or dimethyloxy group. $R_{11}$ is selected from the group consisting of $C_1$–$C_4$ alkyl, alkoxy, and alkamine. Preferably $R_{11}$ is a ethyl, dimethylamino or dimethyloxy group. $R_{12}$ is selected from the group consisting of hydrogen, $C_1$–$C_{20}$ alkyl, aryl, alkaryl, and —$(CH_2CHXO)_p$—, and —C=NHY$_7$(NY$_8$Y$_9$)—. Preferably R$_{12}$ is a hexamethylene, 2-methyl-pentamethylene, or biguanidine group. R$_{13}$ is selected from the group consisting of C$_1$–C$_{20}$ alkyl, aryl, alkaryl, and —(CH$_2$CHXO)$_p$—. Preferably R$_{13}$ is a hexamethylene or 2-methyl-pentamethylene group. R$_{14}$ is selected from the group consisting of hydrogen, C$_1$–C$_{20}$ alkyl, aryl, alkaryl, —(CH$_2$CHXO)$_p$—, and —C=NHY$_1$(NY$_2$Y$_3$)—. Preferably R$_{14}$ is selected from a hydrogen, hexamethylene, 2-methyl-pentamethylene, or biguanidine group. R$_{15}$ is selected from the group consisting of hydrogen, C$_1$–C$_{20}$ alkyl, aryl, alkaryl, —(CH$_2$CHXO)$_p$—, —R$_{16}$R$_{17}$N—R$_{18}$—, and —C=NHY$_7$(NY$_8$Y$_9$)—. Preferably R$_{15}$ is a hexamethylene, 2-methyl-pentamethylene, or biguanidine group.

R$_{16}$ is selected from the group consisting of C$_1$–C$_4$ alkyl, alkoxy, and alkamine. Preferably R$_{16}$ is a ethyl, dimethylamino or dimethyloxy group. R$_{17}$ is selected from the group consisting of C$_1$–C$_4$ alkyl, alkoxy, and alkamine. Preferably R$_{17}$ is a ethyl, dimethylamino or dimethyloxy group. R$_{18}$ is selected from the group consisting of hydrogen, C$_1$–C$_{20}$ alkyl, aryl, alkaryl, and —(CH$_2$CHXO)$_p$—, and —C=NHY$_7$(NY$_8$Y$_9$)—. Preferably R$_{18}$ is a hexamethylene, 2-methyl-pentamethylene, or biguanidine group.

Y$_1$ is a dissociated acid. Y$_2$ is selected from the group consisting of hydrogen, C$_1$–C$_{20}$ alkyl, aryl, alkaryl, and —(CH$_2$CHXO)$_p$—. Y$_3$ is selected from the group consisting of hydrogen, C$_1$–C$_{20}$ alkyl, aryl, alkaryl, —(CH$_2$CHXO)$_p$—, —C=NHY$_4$(NY$_5$Y$_6$)—, and nitrile (—C≡N). Y$_4$ is a dissociated acid. Y$_5$ is selected from the group consisting of hydrogen, C$_1$–C$_{20}$ alkyl, aryl, alkaryl, and —(CH$_2$CHXO)$_p$—. Y$_6$ is selected from the group consisting of hydrogen, C$_1$–C$_{20}$ alkyl, aryl, alkaryl, and —(CH$_2$CHXO)$_p$—. Y$_7$ is a dissociated acid. Y$_8$ is selected from the group consisting of hydrogen, C$_1$–C$_{20}$ alkyl, aryl, alkaryl, and —(CH$_2$CHXO)$_p$—. Y$_6$ is selected from the group consisting of hydrogen, C$_1$–C$_{20}$ alkyl, aryl, alkaryl, —(CH$_2$CHXO)$_p$—, —C=NHY$_{10}$(NY$_{11}$Y$_{12}$)—, and nitrile (—C≡N). Y$_{10}$ is a dissociated acid. Y$_{11}$ is selected from the group consisting of hydrogen, C$_1$–C$_{20}$ alky, aryl, alkaryl, and —(CH$_2$CHXO)$_p$—. Y$_{12}$ is selected from the group consisting of hydrogen, C$_1$–C$_{20}$ alkyl, aryl, alkaryl, and —(CH$_2$CHXO)$_p$—. As used herein, the "acid" in the definitions for Y$_1$, Y$_4$, Y$_7$, and Y$_{10}$ may be any weak or strong monatomic or polyatomic inorganic or organic acid such as hydrochloric acid or sulfuric acid.

In the above structure for the polyamine, the letter a is from 1 to 5,000, preferably from about 2 to about 100, most preferably from about 5 to about 20. The letter b is 0 or 1. The letter p is from 1 to 6, preferably from 2 to 4. The letter q is 0 or 1. The letter r is 0 or 1. The letter s is 0 or 1. The letter w is from 1 to 5,000, preferably from about 2 to about 100, most preferably from about 5 to about 20. The letter x is 0 or 1. The letter y is from 1 to 5,000, preferably from about 2 to about 100, most preferably from about 5 to about 20. The letter z is 0 or 1.

The functionalized polyamine is prepared according to the invention with the following provisos: if R$_2$ and R$_3$ are hydrogen, then x is 0; if R$_8$ and R$_9$ are hydrogen, then z is 0; if R$_{14}$ and R$_{15}$ are hydrogen, then b is 0; if q is 0, then R$_3$ is —R$_4$R$_5$N—R$_6$—; if r is 0, then R$_9$ is —R$_{10}$R$_{11}$N—R$_{12}$—; if s is 0, then R$_{15}$ is —R$_{16}$R$_{17}$N—R$_{18}$—; if R$_6$ is hydrogen, then x is 0; if R$_{12}$ is hydrogen, then z is 0; if R$_{18}$ is hydrogen, then b is 0; if R$_2$ is present, then R$_3$ is selected from the group consisting of C$_1$–C$_{20}$ alkyl, aryl, alkaryl, —(CH$_2$CHXO)$_p$—, R$_{13}$—[—N(R$_{14}$)$_s$R$_{15}$—]$_a$—[—NH$_2$]$_b$, and —C=NHY$_7$(NY$_8$Y$_9$)—; if R$_8$ is present, then R$_9$ is selected from the group consisting of C$_1$–C$_{20}$ alkyl, aryl, alkaryl, and —(CH$_2$CHXO)$_p$—, and —C=NHY$_7$(NY$_8$Y$_9$)—; if R$_{14}$ is present, then R$_{15}$ is selected from the group consisting of C$_1$–C$_{20}$ alkyl, aryl, alkaryl, and —(CH$_2$CHXO)$_p$—, and —C=NHY$_7$(NY$_8$Y$_9$)—; if Y$_8$ and Y$_9$ are hydrogen, then at least one of b, x, and z is 0; and if Y$_{11}$ and Y$_{12}$ are hydrogen, then at least one of b, x, and z is 0.

Specific examples of cyano- or guanidino-containing compounds for use in preparing the functionalized polyamine of the invention are sodium dicyanamide, dicyandiamide, guanidine, biguanidine, dimethylguanidine, sodium cyanamide, and combinations thereof. A combination of cyano- or guanidino-containing compounds may also be used to prepare the functionalized polyamine. Preferably, the cyano- or guanidino-containing compound is sodium dicyanamide or dicyandiamide.

The polyamine (B) is prepared from at least one monomeric amine. Suitable monomeric amines include alkyleneamines, cycloalkyleneamines, arylamines, alkylenearylamines, and alkoxylatedamines. Examples of alkyleneamines include hexamethylenediamine, 2-methylpentamethylenediamine, ethylenediamine, 1,4-diaminobutane, 1,8-diaminooctane, 1,2-diamino-2-methylpropane, diethylenetriamine, triethylenetetraamine, tetraethylenepentaamine, pentaethylenehexaamine, propylenediamine, dipropylenetriamine, and tripropylene tetramine. Examples of cycloalkyleneamines include aziridine, piperazine, and diaminocyclohexane. Examples of arlyamines include diaminobenzene, aminopyridine, and pyrazine. Examples of alkylenearly amines include aminoethylaniline, aminopropylaniline, aminoethylpyridine. Examples of alkoxylatedamines include 2-(2-aminoethylamino)ethanol and 2,2'-oxybis(ethylamine) dihydrochloride. Combinations of the above monomeric amines may also be used. Preferably the polyamine (B) is prepared from a monomeric amine which is selected from the group consisting of hexamethylenediamine, 2-methylpentamethylenediamine, aziridine, ethylenediamine, 1,4-diaminobutane, 1,8-diaminooctane, 1,2-diamino-2-methylpropane, diethylenetriamine, triethylenetetraamine, tetraethylenepentaamine, pentaethylenehexaamine, piperazine, 2-(2-aminoethylamino)ethanol, 2,2'-oxybis (ethylamine)dihydrochloride, propylenediamine, dipropylenetriamine, and tripropylene tetramine. Most preferably the polyamine (B) is prepared from hexamethylenediamine and/or 2-methylpentamethylene diamine.

The cyano- or guanidino-functional groups on the cyano- or guanidino-containing compound (A) are attached to the polyamine (B) to form the functionalized polyamine of the invention. It is within the scope of the invention that the functionalized polyamine may contain unmodified amine groups. The unmodified amine groups may be oxidized to form amine-N-oxides. Alternately, or in addition to, the unmodified amine groups on the functionalized polyamine may be alkoxylated, preferably ethoxylated, and/or quaternized. While not wishing to be bound by any particular theory, the inventors believe that the cyano- or guanidino-containing compounds are attached to the backbone of the polyamine by means of covalent bonds formed by an addition reaction between either the primary, secondary and/or tertiary amines on the polyamine and an imine and/or nitrile group on the cyano- or guanidino-containing compound resulting in an "iminoamine" or amidine (FIG. 1) linkage which may be substituted or unsubstituted.

In a most preferred embodiment of the invention, the functionalized polyamine is the reaction product of sodium dicyanamide and a polyamine prepared from hexamethylene diamine, wherein the functionalized polyamine has the structure:

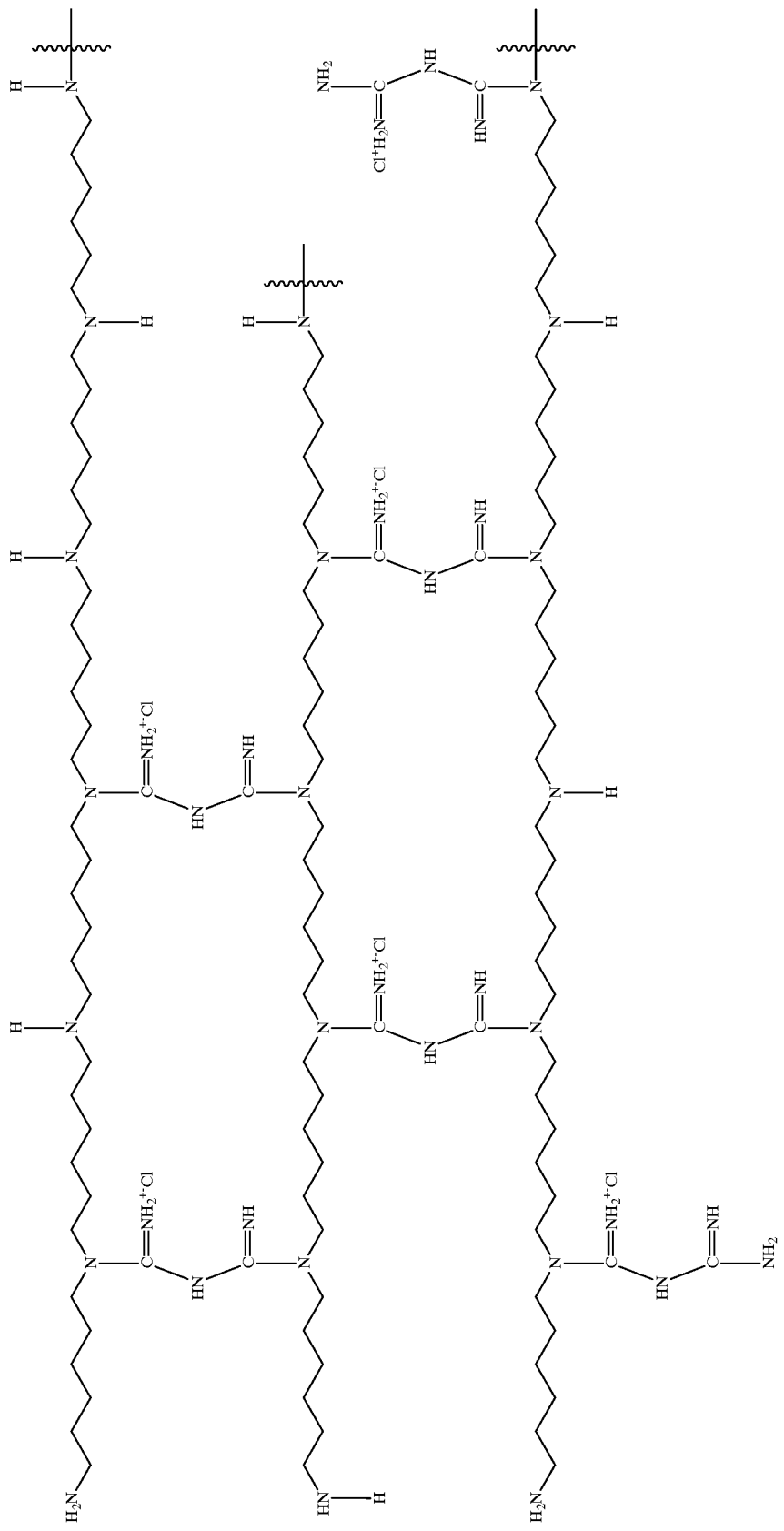

In a first preferred embodiment of the invention, the functionalized polyamine has a linear backbone which is represented by the following structure:

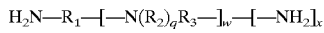

wherein $R_2$ is hydrogen; $R_3$ is selected from the group consisting of hydrogen, $C_1$–$C_{20}$ alkyl, aryl, alkaryl, —(CH$_2$CHXO)$_p$—, —R$_4$R$_5$N—R$_6$—, R$_{13}$—[—N(R$_{14}$)$_s$R$_{15}$—]$_a$—[—NH$_2$]$_b$, and —C=NHY$_7$(NY$_8$Y$_9$)—. More preferably, $R_1$ and $R_3$ are independently hexamethylene, 2-methylpentamethylene, or biguanidine groups, with the majority of the groups being hexamethylene and 2-methylpentamethylene. $R_2$ is hydrogen, q is 1, and w is from about 2 to about 100.

In a second preferred embodiment of the invention, the functionalized polyamine has a linear backbone which incorporates cyclic and acyclic moieties and is represented by the following structure:

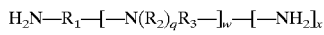

wherein the cyclic moiety of the functionalized polyamine is defined when q is 0; $R_3$ is —R$_4$R$_5$N—R$_6$—, provided that if $R_6$ is hydrogen, then x is 0; and the acyclic moiety of the functionalized polyamine is defined when q is 1; $R_2$ is hydrogen; and $R_3$ is selected from the group consisting of hydrogen, $C_1$–$C_{20}$ alkyl, aryl, alkaryl, —(CH$_2$CHXO)$_p$—, and —C=NHY$_7$(NY$_8$Y$_9$)—, providing that if $R_2$ and $R_3$ are hydrogen, then x is 0; if $Y_8$ and $Y_9$ are hydrogen, then x is 0; if $Y_{11}$ and $Y_{12}$ are hydrogen, then x is 0. More preferably, $R_4$ and $R_5$ are ethylene, $R_1$, $R_3$, and $R_6$ are independently hexamethylene, 2-methylpentamethylene, or biguanidine groups, with the majority of the groups being hexamethylene and/or 2-methylpentamethylene; w is from about 2 to about 100.

In a third preferred embodiment of the invention, the functionalized polyamine is multiply branched and is represented by the following structure:

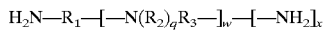

wherein $R_2$ is selected from the group consisting of $C_1$–$C_{20}$ alkyl, aryl, alkaryl, —(CH$_2$CHXO)$_p$—, —R$_7$—[—N(R$_8$)$_r$$_9$—]$_y$—[—NH$_2$]$_z$, and —C=NHY$_1$(NY$_2$Y$_3$)—; $R_3$ is selected from the group consisting of $C_1$–$C_{20}$ alkyl, aryl, alkaryl, —(CH$_2$CHXO)$_p$—, —R$_4$R$_5$N—R$_6$—, R$_{13}$—[—N(R$_{14}$)$_s$R$_{15}$—]$_a$—[—NH$_2$]$_b$, and —C=NHY$_7$(NY$_8$Y$_9$)—, and q is 1. It is within the scope of the invention that the functionalized polyamine may comprise further branching or higher degrees of branching which have not been depicted.

In a preferred functionalized polyamine branched structure, $R_1$ $R_2$, $R_3$, $R_7$, and $R_{13}$ are independently hexamethylene or 2-methylpentamethylene; $R_8$ and $R_4$, if present, are independently selected from the group consisting of hydrogen, hexamethylene and 2-methylpentamethylene; $R_9$ is selected from the group consisting of hexamethylene, 2-methylpentamethylene, and —R$_{10}$R$_{11}$N—R$_{12}$—; $R_{10}$ is ethylene; $R_{11}$ is ethylene; $R_{12}$ is selected from the group consisting of hydrogen, hexamethylene and 2-methylpentamethylene; $R_{15}$ is selected from the group consisting of hexamethylene, 2-methylpentamethylene, and —R$_{16}$R$_{17}$N—R$_{18}$—; $R_{16}$ is ethylene; $R_{17}$ is ethylene; $R_{18}$ is selected from the group consisting of hydrogen, hexamethylene and 2-methylpentamethylene; a is from about 2 to about 100; x is 1; y is from about 2 to about 100; and w is from about 2 to about 100.

The functionalized polyamines of the invention comprise modified homogeneous and non-homogeneous polyamine backbones, wherein 100% or less of the —NH units are modified. As used herein, "homogeneous polyamine backbone" means a polyamine backbone having multiple occurrences of the same repeating unit (i.e., all hexamethylene). However, "homogeneous polyamine backbone" does not exclude polyamines that comprise other extraneous units comprising the polyamine backbone which are present as a consequence of the chosen method of chemical synthesis. For example, ethanolamine may be used as an "initiator" in the synthesis of polyethyleneimines, therefore, a sample of polyethyleneimine that comprises one hydroxyethyl moiety resulting from the polymerization "initiator" would be considered to comprise a homogeneous polyamine backbone for the purposes of the invention.

As used herein, "non-homogeneous polyamine backbone" means polyamine backbones that are a composite of structurally varied repeating units. For example, a non-homogeneous polyamine backbone comprises multiple units that are a mixture of hexamethylene and 2-methylpentamethylene units. The proper manipulation of the various repeating units which determine the overall structure provides the formulator with the ability to modify the formulation compatibility, color protection and anti-dye transfer properties of the functionalized polyamines of the invention.

The relative proportions of primary, secondary, and tertiary amine units in the polyamine backbone will vary depending on the manner of preparation. Each hydrogen atom attached to each nitrogen atom of the polyamine backbone chain represents a potential site for subsequent substitution of the cyano- or guanidino-containing compounds. Preferred functionalized polyamines of the invention comprise homogeneous polyamine backbones that are totally or partially substituted by the cyano- or guanidino-containing compounds.

The functionalized polyamines are prepared by means of a polymerization reaction, preferably in water. The polymerization may be conducted in the presence of an inorganic acid and/or an organic acid. Salts of the inorganic acid and/or organic acid may also be included in the polymerization. Suitable inorganic acids are hydrochloric acid and sulfuric acid. Suitable organic acids are acetic acid. The inorganic acid and organic acid may, for example, be added to the polymerization to neutralize the amine functionality.

Although the reaction proceeds without a catalyst, a catalyst may be employed to speed up the reaction. Suitable catalysts are known to those skilled in the art.

In general, the temperature of polymerization will vary with the particular reactants, catalysts, etc. In general, the reaction is carried out from about 75° C. to 200° C., preferably from 100° C. to 180° C., more preferably from 120° C. to 170° C. Optimum temperatures will vary with the particular system.

In one embodiment, the functionalized polyamines are used in detergent compositions. The level of the functionalized polyamine in the detergent compositions is from about 0.01 to about 90 weight percent, more preferably from about 0.05 to about 20 percent, most preferably from about 0.1 to about 10 weight percent of the detergent composition.

In a second embodiment, the functionalized polyamines are used in fabric softening compositions. The level of the functionalized polyamine in the fabric softening compositions is from about 0.01 to about 90 weight percent, more preferably from about 0.05 to about 20 percent, most preferably from about 0.1 to about 10 weight percent of the detergent composition.

DETERGENT INGREDIENTS

Detergent compositions according to the present invention comprise in addition to the functionalized polyamines a surfactant system wherein the surfactant can be selected from nonionic and/or anionic and/or cationic and/or ampholytic and/or zwitterionic and/or semi-polar surfactants. Preferred surfactant systems to be used according to the present invention comprise as a surfactant one or more of the nonionic surfactants described herein. These nonionic surfactants have found to be very useful in that the dye transfer inhibiting performance of the functionalized polyamines has been increased in the presence of said surfactants.

Nonionic Surfactants

Polyethylene, polypropylene, and polybutylene oxide condensates of alkyl phenols are suitable for use as the nonionic surfactant of the surfactant systems of the present invention, with the polyethylene oxide condensates being preferred. These compounds include the condensation products of alkyl phenols having an alkyl group containing from about 6 to about 14 carbon atoms, preferably from about 8 to about 14 carbon atoms, in either a straight-chain or branched-chain configuration with the alkylene oxide. In a preferred embodiment, the ethylene oxide is present in an amount equal to from about 2 to about 25 moles, more preferably from about 3 to about 15 moles, of ethylene oxide per mole of alkyl phenol. Commercially available nonionic surfactants of this type include IGEPAL CO-630 and TRITON X-45, X-114, X-100 and X-102. These surfactants are commonly referred to as alkyl phenol alkoxylates (e.g., alkyl phenol ethoxylates).

The condensation products of primary and secondary aliphatic alcohols with from about 1 to about 25 moles of ethylene oxide are suitable for use as the nonionic surfactant of the nonionic surfactant systems of the present invention. The alkyl chain of the aliphatic alcohol can either be straight or branched, primary or secondary, and generally contains from about 8 to about 22 carbon atoms. Preferred are the condensation products of alcohols having an alkyl group containing from about 8 to about 20 carbon atoms, more preferably from about 10 to about 18 carbon atoms, with from about 2 to about 10 moles of ethylene oxide per mole of alcohol. Examples of commercially available nonionic surfactants of this type include TERGITOL 15-S-9 (the condensation product of $C_{11}$–$C_{15}$ linear alcohol with 9 moles ethylene oxide), TERGITOL 24-L-6 NMW (the condensation product of $C_{12}$–$C_{14}$ primary alcohol with 6 moles ethylene oxide with a narrow molecular weight distribution); NEODOL 45-9 (the condensation product of $C_{14}$–$C_{15}$ linear alcohol with 9 moles of ethylene oxide), NEODOL 23-6.5 (the condensation product of $C_{12}$–$C_{13}$ linear alcohol with 6.5 moles of ethylene oxide), NEODOL 45-7 (the condensation product of $C_{14}$–$C_{15}$ linear alcohol with 7 moles of ethylene oxide), NEODOL 45-4 (the condensation product of $C_{14}$–$C_{15}$ linear alcohol with 4 moles of ethylene oxide); and KYRO EOB (the condensation product of $C_{13}$–$C_{15}$ alcohol with 9 moles ethylene oxide).

Also useful as the nonionic surfactant of the surfactant systems of the present invention are alkylpolysaccharides having a hydrophobic group containing from about 6 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties (optionally the hydrophobic group is attached at the 2-, 3-, 4-, etc., positions thus giving a glucose or galactose as opposed to a glucoside or galactoside). The intersaccharide bonds can be, e.g., between the one position of the additional saccharide units and the 2-, 3-, 4-, and/or 6-positions on the preceding saccharide units.

The preferred alkylpolyglycosides have the formula

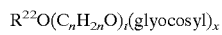

wherein $R^{22}$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

Other suitable nonionic surfactants are the condensation products of ethylene oxide with a hydrophobic base formed by the condensation of propylene oxide with propylene glycol are also suitable for use as the additional nonionic surfactant of the nonionic surfactant systems of the present invention. The hydrophobic portion of these compounds will preferably have a molecular weight of from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include surfactants available under the trademark PLURONIC.

Also suitable for use as the nonionic surfactant of the nonionic surfactant system of the present invention, are the condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant are available under the trademark TETRONIC.

Preferred for use as the nonionic surfactant of the surfactant systems of the present invention are polyethylene oxide condensates of alkyl phenols, condensation products of primary and secondary aliphatic alcohols with from about 1 to about 25 moles of ethylene oxide, alkylpolysaccharides, and mixtures thereof. Most preferred are $C_8$–$C_{14}$ alkyl phenol ethoxylates having from 3 to 15 ethoxy groups and $C_8$–$C_{18}$ alcohol ethoxylates having from 2 to 10 ethoxy groups, and mixtures thereof.

Highly preferred nonionic surfactants are polyhydroxy fatty acid amide surfactants of the formula:

wherein $R^{31}$ is H, or $C_{1-4}$ hydrocarbyl, 2-hydroxy ethyl, 2-hydroxy propyl or a mixture thereof, $R^{32}$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^{31}$ is methyl, $R^{32}$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

When included in such laundry detergent compositions, the nonionic surfactant systems of the present invention act to improve the greasy/oily stain removal properties of such laundry detergent compositions across a broad range of laundry conditions.

Anionic Surfactants

Highly preferred anionic surfactants include alkyl alkoxylated sulfate surfactants which can be water soluble salts or acids of the formula $R^{40}O(A)mSO_3M$ wherein $R^{40}$ is an unsubstituted $C_{10}-C_{24}$ alkyl or hydroxyalkyl group having a $C_{10}-C_{24}$ alkyl component, preferably a $C_{12}-C_{20}$ alkyl or hydroxyalkyl, more preferably $C_{12}-C_{18}$ alkyl or hydroxyalkyl, A is an ethoxy or propoxy unit, m is greater than zero, typically between about 0.5 and about 6, more preferably between about 0.5 and about 3, and M is/or a cation which can be, for example, a metal cation (e.g., sodium, potassium, lithium, calcium, magnesium, etc.), ammonium or substituted-ammonium cation. Alkyl ethoxylated sulfates as well as alkyl propoxylated sulfates are contemplated herein. Specific examples of substituted ammonium cations include methyl-, dimethyl, trimethyl-ammonium cations and quaternary ammonium cations such as tetramethyl-ammonium and dimethyl piperdinium cations and those derived from alkylamines such as ethylamine, diethylamine, triethylamine, mixtures thereof, and the like. Exemplary surfactants are $C_{12}-C_{18}$ alkyl polyethoxylate (1.0) sulfate ($C_{12}-C_{18}E(1.0)M$), $C_{12}-C_{18}$ alkyl polyethoxylate (2.25) sulfate ($C_{12}-C_{18}E(2.25)M$), $C_{12}-C_{18}$ alkyl polyethoxylate(3.0)sulfate ($C_{12}-C_{18}E(3.0)M$), and $C_{12}-C_{18}$ alkyl polyethoxylate (4.0) sulfate ($C_{12}-C_{18}E(4.0)M$), wherein M is conveniently selected from sodium and potassium.

Suitable anionic surfactants to be used are alkyl ester sulfonate surfactants including linear esters of $C_8-C_{20}$ carboxylic acids (i.e., fatty acids) which are sulfonated with gaseous $SO_3$. Suitable starting materials for preparing such sulfonated surfactants would include natural fatty substances as derived from tallow, palm oil, etc.

The preferred alkyl ester sulfonate surfactant, especially for laundry applications, comprise alkyl ester sulfonate surfactants of the structural formula:

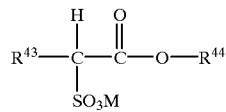

wherein $R^{43}$ is a $C_8-C_{20}$ hydrocarbyl, preferably an alkyl, or combination thereof, $R^{44}$ is a $C_1-C_6$ hydrocarbyl, preferably an alkyl, or combination thereof, and M is a cation which forms a water soluble salt with the alkyl ester sulfonate. Suitable salt-forming cations include metals such as sodium, potassium, and lithium, and substituted or unsubstituted ammonium cations, such as monoethanolamine, diethanolamine, and triethanolamine. Preferably, $R^{43}$ is $C_{10}-C_{16}$ alkyl, and $R^{44}$ is methyl, ethyl or isopropyl. Especially preferred are the methyl ester sulfonates wherein $R^{43}$ is $C_{10}-C_{16}$ alkyl.

Other suitable anionic surfactants include the alkyl sulfate surfactants which can be water soluble salts or acids of the formula $R^{50}OSO_3M$ wherein $R^{50}$ preferably is a $C_{10}-C_{24}$ hydrocarbyl, preferably an alkyl or hydroxyalkyl having a $C_{10}-C_{20}$ alkyl component, more preferably a $C_{12}-C_{18}$ alkyl or hydroxyalkyl, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations such as tetramethyl-ammonium and dimethyl piperdinium cations and quaternary ammonium cations derived from alkylamines such as ethylamine, diethylamine, triethylamine, and mixtures thereof, and the like). Typically, alkyl chains of $C_{12}-C_{16}$ are preferred for lower wash temperatures (e.g., below about 50° C.) and $C_{16-18}$ alkyl chains are preferred for higher wash temperatures (e.g., above about 50° C.).

Other anionic surfactants useful for detersive purposes can also be included in the laundry detergent compositions of the present invention. These can include salts (including, for example, sodium, potassium, ammonium, and substituted ammonium salts such as mono-, di- and triethanolamine salts) of soap, $C_9-C_{20}$ linear alkylbenzenesulfonates, $C_8-C_{22}$ primary or secondary alkanesulfonates, $C_8-C_{24}$ olefinsulfonates, sulfonated polycarboxylic acids prepared by sulfonation of the pyrolyzed product of alkaline earth metal citrates, $C_8-C_{24}$ alkylpolyglycolethersulfates (containing up to 10 moles of ethylene oxide); alkyl glycerol sulfonates, fatty acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinates (especially saturated and unsaturated $C_{12}-C_{18}$ monoesters) and diesters of sulfosuccinates (especially saturated and unsaturated $C_6-C_{12}$ diesters), acyl sarcosinates, sulfates of alkylpolysaccharides such as the sulfates of alkylpolyglucoside (the nonionic nonsulfated compounds being described below), branched primary alkyl sulfates, and alkyl polyethoxy carboxylates such as those of the formula $R^{60}O(CH_2CH_2O)_k-CH_2COO^-M^+$ wherein $R^{60}$ is a $C_8-C_{22}$ alkyl, k is an integer from 0 to 10, and M is a soluble salt-forming cation. Further examples of anionic surfactants are described in "Surface Active Agents and Detergents" (Vols. I and II by Schwartz, Perry, and Berch), which is hereby incorporated herein by reference.

When included therein, the laundry detergent compositions of the present invention typically comprise from about 1% to about 60%, preferably from about 3% to about 30% by weight of such anionic surfactants.

Cationic Surfactants

Cationic detersive surfactants suitable for use in the laundry detergent compositions of the present invention are those having one long-chain hydrocarbyl group. Examples of such cationic surfactants include the ammonium surfactants such as alkyldimethylammonium halogenides, and those surfactants having the formula:

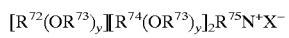

wherein $R^{72}$ is an alkyl or alkyl benzyl group having from about 8 to about 18 carbon atoms in the alkyl chain, each $R^{73}$ is selected from —$CH_2CH_2$—, —$CH_2CH(CH_3)$—, —$CH_2CH(CH_2OH)$—, —$CH_2CH_2CH_2$—, and mixtures thereof, each $R^{74}$ is selected from the group consisting of $C_1$–$C_4$ alkyl, $C_1$–$C_4$ hydroxyalkyl, benzyl ring structures formed by joining the two $R^{74}$ groups, —$CH_2$CHOH—CHOHCOR$^{76}$CHOHCH$_2$OH wherein $R^{76}$ is any hexose or hexose polymer having a molecular weight less than about 1000, and hydrogen when y is not 0; $R^{75}$ is the same as $R^{74}$ or is an alkyl chain wherein the total number of carbon atoms of $R^{74}$ plus $R^{75}$ is not more than about 18; each y is from 0 to about 10 and the sum of the y values is from 0 to about 15; and X is any compatible anion.

Useful cationic surfactants are the water-soluble quaternary ammonium compounds useful in the present composition having the formula:

$$R^{81}R^{82}R^{83}R^{84}N^+X^-$$

wherein $R^{81}$ is $C_8$–$C_{16}$ alkyl, each of $R^{82}$, $R^{83}$ and $R^{84}$ is independently $C_1$–$C_4$ alkyl, $C_1$–$C_4$ hydroxy alkyl, benzyl, and —$(C_2H_4O)_xH$ where x has a value from 2 to 5, and X is an anion.

The preferred alkyl chain length for $R^{81}$ is $C_{12}$–$C_{15}$ particularly where the alkyl group is a mixture of chain lengths derived from coconut or palm kernel fat or is derived synthetically by olefin build up or OXO alcohols synthesis. Preferred groups for $R^{82}$, $R^{83}$ and $R^{84}$ are methyl and hydroxyethyl groups and the anion X may be selected from halide, methosulphate, acetate and phosphate ions.

Examples of suitable quaternary ammonium compounds are coconut trimethyl ammonium chloride or bromide, coconut methyl dihydroxyethyl ammonium chloride or bromide, decyl triethyl ammonium chloride, decyl dimethyl hydroxyethyl ammonium chloride or bromide, $C_{12-15}$ dimethyl hydroxyethyl ammonium chloride or bromide, coconut dimethyl hydroxyethyl ammonium chloride or bromide, myristyl trimethyl ammonium methyl sulphate, lauryl dimethyl benzyl ammonium chloride or bromide, lauryl dimethyl (ethenoxy)4 ammonium chloride or bromide, and choline esters (compounds wherein $R^{81}$ is —$CH_2$—O—C—$C_{12-14}$ alkyl and $R^{82}R^{83}R^{84}$ are methyl).

When included therein, the laundry detergent compositions of the present invention typically comprise from 0% to about 25%, preferably from about 3% to about 15% by weight of such cationic surfactants.

Ampholytic Surfactants

Ampholytic surfactants are also suitable for use in the laundry detergent compositions of the present invention. These surfactants can be broadly described as aliphatic derivatives of secondary or tertiary amines, or aliphatic derivatives of heterocyclic secondary and tertiary amines in which the aliphatic radical can be straight- or branched-chain. One of the aliphatic substituents contains at least about 8 carbon atoms, typically from about 8 to about 18 carbon atoms, and at least one contains an anionic water-solubilizing group, e.g., carboxy, sulfonate, sulfate.

When included therein, the laundry detergent compositions of the present invention typically comprise from 0% to about 15%, preferably from about 1% to about 10% by weight of such ampholytic surfactants.

Zwitterionic Surfactants

Zwitterionic surfactants or amphoteric surfactants are also suitable for use in laundry detergent compositions. These surfactants can be broadly described as derivatives of secondary and tertiary amines, derivatives of heterocyclic secondary and tertiary amines, or derivatives of quaternary ammonium, quaternary phosphonium or tertiary sulfonium compounds.

When included therein, the laundry detergent compositions of the present invention typically comprise from 0% to about 15%, preferably from about 1% to about 10% by weight of such zwitterionic surfactants.

Semi-polar Nonionic Surfactants

Semi-polar nonionic surfactants are a special category of nonionic surfactants which include water-soluble amine oxides containing one alkyl moiety of from about 10 to about 18 carbon atoms and two moieties selected from the group consisting of alkyl groups and hydroxyalkyl groups containing from about 1 to about 3 carbon atoms; water-soluble phosphine oxides containing one alkyl moiety of from about 10 to about 18 carbon atoms and two moieties selected from alkyl groups and hydroxyalkyl groups containing from about 1 to about 3 carbon atoms; and water-soluble sulfoxides containing one alkyl moiety of from about 10 to about 18 carbon atoms and a moiety selected from the group consisting of alkyl and hydroxyalkyl moieties of from about 1 to about 3 carbon atoms.

Semi-polar nonionic detergent surfactants include the amine oxide surfactants having the formula

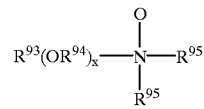

wherein $R^{93}$ is an alkyl, hydroxyalkyl, or alkyl phenyl group or mixtures thereof containing from about 8 to about 22 carbon atoms; $R^{94}$ is an alkylene or hydroxyalkylene group containing from about 2 to about 3 carbon atoms or mixtures thereof; x is from 0 to about 3; and $R^{95}$ is independently an alkyl or hydroxyalkyl group containing from about 1 to about 3 carbon atoms or a polyethylene oxide group containing from about 1 to about 3 ethylene oxide groups. The $R^{95}$ groups can be attached to each other, e.g., through an oxygen or nitrogen atom, to form a ring structure. These amine oxide surfactants in particular include $C_{10}$–$C_{18}$ alkyl dimethyl amine oxides and $C_8$–$C_{12}$ alkoxy ethyl dihydroxy ethyl amine oxides.

When included therein, the laundry detergent compositions of the present invention typically comprise from 0% to about 15%, preferably from about 1% to about 10% by weight of such semi-polar nonionic surfactants.

The present invention further provides laundry detergent compositions comprising at least 1% by weight, preferably from about 3% to about 65%, more preferably from about 20% to about 40% by weight of total surfactants.

Preferred detergent ingredients that can be included are detersive enzymes which can be included in the detergent formulations for a wide variety of purposes including removal of protein-based, carbohydrate-based, or triglyceride-based stains, for example, and prevention of refugee dye transfer. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin.

Enzymes are normally incorporated at levels sufficient to provide up to about 5 mg by weight, more typically about 0.05 mg to about 3 mg, of active enzyme per gram of the composition. Highly preferred enzymes to be incorporated in the detergent compositions according to the present invention are cellulases or peroxidases and mixtures thereof.

Peroxidase enzymes are used in combination with oxygen sources, e.g., percarbonate, perborate, persulfate, hydrogen peroxide, etc. They are used for "solution bleaching", i.e., to prevent transfer of dyes of pigments removed from substrates during wash operations to other substrates in the wash solution. Peroxidase enzymes are known in the art, and include, for example, horseradish peroxidase, ligninase, and haloperoxidase such as chloro- and bromo-peroxidase.

Enzyme stabilization techniques for aqueous detergent compositions are well known in the art. For example, one technique for enzyme stabilization in aqueous solutions involves the use of free calcium ions from sources such as calcium acetate, calcium formate and calcium propionate.

Calcium ions can be used in combination with short chain carboxylic acid salts, preferably formates. It has also been proposed to use polyols like glycerol and sorbitol. Alkoxy-alcohols, dialkylglycoethers, mixtures of polyvalent alcohols with polyfunctional aliphatic amines (e.g., such as diethanolamine, triethanolamine, di-isopropanolamime, etc.), and boric acid or alkali metal borate. Other suitable detergent ingredients that can be added are enzyme oxidation scavengers. Examples of such enzyme oxidation scavengers are ethoxylated tetraethylene polyamines.

Especially preferred detergent ingredients are combinations with technologies which may provide additional anti-dye transfer benefits. Examples of these technologies are polyvinyl pyrrolidone and polyamine-N-oxide containing polymers. Other examples are cellulase and/or peroxidases and/or metallo catalyst for anti-dye transfer benefits.

Bleaching agents may be included in the detergent compositions of the present invention. These bleaching agent components can include, for example, one or more oxygen bleaching agents or halogen bleaching agents and, depending upon the bleaching agent chosen, one or more bleach activators. The bleaching agent can be an activated or non-activated bleaching agent. When present bleaching compounds will typically be present at levels of from about 1% to about 10%, of the detergent composition. In general, bleaching compounds are optional components in non-liquid formulations, e.g., granular detergents. If present, the amount of bleach activators will typically be from about 0.1% to about 60%, more typically from about 0.5% to about 40% of the bleaching composition.

Suitable bleaching agents include magnesium monoperoxyphthalate hexahydrate, the magnesium salt of meta-chloro perbenzoic acid, 4-nonylamino-4-oxoperoxybutyric acid, diperoxydodecanedioic acid, 6-nonylamino-6-oxoperoxycaproic acid, trichloro isocyanuric acid and the sodium and potassium dichloroisocyanurates, N-chloro and N-bromo alkane sulphonamides, hydrogen peroxide releasing agents such as hydrogen peroxide, perborates, e.g., perborate monohydrate, perborate tetrahydrate, persulfates, percarbonates, peroxydisulfates, perphosphates and peroxyhydrates. Preferred bleaches are percarbonates and perborates.

Suitable bleach activators include tetraacetylethylenediamine, nonanoyloxybenzenesulfonate, 3,5,-trimethylhexanoloxybenzenesulfonate, pentaacetylglucose, and acylated citrate esters.

The hydrogen peroxide may also be present by adding an enzymatic system (i.e., an enzyme and a substrate therefore) which is capable of generating hydrogen peroxide at the beginning or during the washing and/or rinsing process.

Additional bleaching agents that may be used are photo-activated bleaching agents such as the sulfonated zinc and/or aluminum phthalocyanines. These materials can be deposited upon the substrate during the washing process. Upon irradiation with light, in the presence of oxygen, such as by hanging clothes out to dry in the daylight, the sulfonated zinc phthalocyanine is activated and, consequently, the substrate is bleached.

The detergent compositions according to the present invention may further comprise a builder system. Any conventional builder system is suitable for use herein including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable builders can be an inorganic ion exchange material, commonly an inorganic hydrated aluminosilicate material, more particularly a hydrated synthetic zeolite such as hydrated zeolite A, X, B or HS. Another suitable inorganic builder material is layered silicate, e.g., SKS-6 (Hoechst). SKS-6 is a crystalline layered silicate consisting of sodium silicate ($Na_2Si_2O_5$).

Suitable polycarboxylates containing one carboxy group include lactic acid, glycolic acid and ether derivatives thereof. Polycarboxylates containing two carboxy groups include the water-soluble salts of succinic acid, malonic acid, (ethylenedioxy) diacetic acid, maleic acid, diglycollic acid, tartaric acid, tartronic acid and fumaric acid.

Polycarboxylates containing three carboxy groups include, in particular, water-soluble citrates, aconitrates and citraconates as well as succinate derivatives such as the carboxymethyloxysuccinates, lactoxysuccinates, and the oxypolycarboxylate materials such as 2-oxa-1,1,3-propane tricarboxylates.

Polycarboxylates containing four carboxy groups include oxydisuccinates, 1,1,2,2-ethane tetracarboxylates, 1,1,3,3-propane tetracarboxylates and 1,1,2,3-propane tetracarboxylates. Polycarboxylates containing sulfo substituents include the sulfosuccinate derivatives and the sulfonated pyrolysed citrates. Polycarboxylates containing phosphono substituents may also be used.

Alicyclic and heterocyclic polycarboxylates include cyclopentane-cis,cis,cis-tetracarboxylates, cyclopentadienide pentacarboxylates, 2,3,4,5-tetrahydrofuran-cis,cis,cis-tetracarboxylates, 2,5-tetrahydrofuran-cis-dicarboxylates, 2,2,5,5-tetrahydrofuran-tetracarboxylates, 1,2,3,4,5,6-hexanehexacarboxylates and carboxymethyl derivatives of polyhydric alcohols such as sorbitol, mannitol and xylitol. Aromatic polycarboxylates include mellitic acid, pyromellitic acid and phtalic acid derivatives. The preferred polycarboxylates are hydroxycarboxylates containing up to three carboxy groups per molecule, more particularly citrates.

Preferred builder systems for use in the present compositions include a mixture of a water-insoluble aluminosilicate builder such as zeolite A or of a layered silicate (SKS/6), and a water-soluble carboxylate chelating agent such as citric acid.

A suitable chelant for inclusion in the detergent compositions in accordance with the invention is ethylenediamine-N,N'-disuccinic acid (EDDS) or the alkali metal, alkaline earth metal, ammonium, or substituted ammonium salts thereof, or mixtures thereof. Preferred EDDS compounds are the free acid form and the sodium or magnesium salt thereof. Examples of such preferred sodium salts of EDDS include $Na_2EDDS$ and $Na_4EDDS$. Examples of such preferred magnesium salts of EDDS include MgEDDS and $Mg_2EDDS$.

Suitable fatty acid builders for use herein are saturated or unsaturated $C_{10-18}$ fatty acids, as well as the corresponding soaps. Preferred saturated species have from 12 to 16 carbon atoms in the alkyl chain such as oleic acid.

Preferred builder systems for use in granular compositions include a mixture of a water-insoluble aluminosilicate builder such as zeolite A, and a water soluble carboxylate chelating agent such as citric acid.

Other builder materials that can form part of the builder system for use in granular compositions include inorganic materials such as alkali metal carbonates, bicarbonates, silicates, and organic materials such as the organic phosphonates, amino polyalkylene phosphonates and amino polycarboxylates.

Other suitable water-soluble organic salts are the homo- or co-polymeric acids or their salts, in which the polycarboxylic acid comprises at least two carboxyl radicals separated from each other by not more than two carbon atoms, for example Alcosperse 175. Detergency builder salts are normally included in amounts of from 10% to 80% by weight of the composition preferably from 20% to 70% and most usually from 30% to 60% by weight.

Another optional ingredient is a suds suppressor, exemplified by silicones, and silica-silicone mixtures. Silicones can be generally represented by alkylated polysiloxane materials while silica is normally used in finely divided forms exemplified by silica aerogels and xerogels and hydrophobic silicas of various types. These materials can be incorporated as particulates in which the suds suppressor is advantageously releasably incorporated in a water-soluble or water-dispersible, substantially non-surface-active detergent impermeable carrier. Alternatively the suds suppressor can be dissolved or dispersed in a liquid carrier and applied by spraying on to one or more of the other components. Especially preferred suds controlling agents are the suds suppressor system comprising a mixture of silicone oils and 2-alkyl-alcanols or a silicone/silica mixture in combination with fumed nonporous silica such as AEROSIL. Suitable 2-alkyl-alcanols are 2-butyl-octanol which are commercially available under the trade name ISOFOL 12 R. The suds suppressors described above are normally employed at levels of from 0.001% to 2% by weight of the detergent composition, preferably from 0.01% to 1% by weight.

Other components used in detergent compositions may be employed, such as soil-suspending agents soil-release agents, optical brighteners, abrasives, bactericides, tarnish inhibitors, coloring agents, and/or encapsulated or non-encapsulated perfumes.

Antiredeposition and soil suspension agents suitable herein include cellulose derivatives such as methylcellulose, carboxymethylcellulose and hydroxyethylcellulose, and homo- or co-polymeric polycarboxylic acids or their salts. Polymers of this type include the polyacrylates and maleic anhydride-acrylic acid copolymers previously mentioned as builders, as well as copolymers of maleic anhydride with ethylene, methylvinyl ether or methacrylic acid, the maleic anhydride constituting at least 20 mole percent of the copolymer. These materials are normally used at levels of from 0.5% to 10% by weight, more preferably from 0.75% to 8%, most preferably from 1% to 6% by weight of the composition.

Preferred optical brighteners are anionic in character, examples of which are disodium $4,4^1$-bis-(2-diethanolamino-4-anilino-s-triazin-6-ylamino)stilbene-$2:2^1$disulphonate, disodium $4,4^1$-bis-(2,4-dianilino-s-triazin-6-ylaminostilbene-$2:2^1$-disulphonate, disodium $4,4^1$-bis-(2,4-dianilino-s-triazin-6-ylamino)stilbene-$2:2^1$-disulphonate, monosodium $4^1,4^{11}$-bis-(2,4-dianilino-s-triazin-6ylamino)stilbene-2-sulphonate, disodium $4,4^1$-bis-(2-anilino-4-(N-methyl-N-2-hydroxyethylamino)-s-triazin-6-ylamino)stilbene-$2,2^1$-disulphonate, isodium $4,4^1$-bis-(4-phenyl-2,1,3-triazol-2-yl)-stilbene-$2,2^1$disulphonate, disodium $4,4^1$bis(2-anilino-4-(1-methyl-2-hydroxyethylamino)-s-triazin-6-ylamino)stilbene-2, $2^1$disulphonate and sodium 2(stilbyl-$4^{11}$-(naphtho-$1^1,2^1$:4,5)-1,2,3-triazole-$2^{11}$-sulphonate.

Other useful polymeric materials are the polyethylene glycols, particularly those of molecular weight 1000–10000, more particularly 2000 to 8000 and most preferably about 4000. These are used at levels of from 0.20% to 5% more preferably from 0.25% to 2.5% by weight. These polymers and the previously mentioned homo- or co-polymeric polycarboxylate salts are valuable for improving whiteness maintenance, fabric ash deposition, and cleaning performance on clay, proteinaceous and oxidizable soils in the presence of transition metal impurities.

Soil release agents useful in compositions of the present invention are conventionally copolymers or terpolymers of terephthalic acid with ethylene glycol and/or propylene glycol units in various arrangements.

Also useful are modified polyesters as random copolymers of dimethyl terephtalate, dimethyl sulfoisophtalate, ethylene glycol and 1–2 propane diol, the end groups consisting primarily of sulphobenzoate and secondarily of mono esters of ethylene glycol and/or propane-diol. The target is to obtain a polymer capped at both ends by sulphobenzoate groups, "primarily", in the present context most of said copolymers herein will be end-capped by sulphobenzoate groups. However, some copolymers will be less than fully capped and, therefore, their end groups may consist of monoester of ethylene glycol and/or propane 1–2 diol, thereof consist "secondarily" of such species.

The selected polyesters herein contain about 46% by weight of dimethyl terephtalic acid, about 16% by weight of propane—1.2 diol, about 10% by weight ethylene glycol about 13% by weight of dimethyl sulfobenzoid acid and about 15% by weight of sulfoisophtalic acid, and have a molecular weight of about 3,000.

The detergent composition may be a solid or liquid composition. If the detergent composition is solid, the detergent composition may be in any of the usual physical forms, such as for example, powders, beads, flakes, bars, tablets, noodles, pastes, and slurries. If the detergent composition is liquid, the detergent composition preferably disperses or solubilizes the biguanidine functionalized polyamine so that it is easily contacted with the cellulosic article. The liquid detergent composition may be aqueous or nonaqueous, and structured or nonstructured. For example, the biguanidine functionalized polyamine may be dissolved or dispersed in water, in one or more solvents or inert diluents. Preferably the detergent composition is aqueous and has a pH of from about 7 to about 11, more preferably a pH of from about 9 to about 10.5.

Granular compositions according to the present invention can also be in "compact form", i.e., they may have a relatively higher density than conventional granular detergents, i.e., from 550 to 950 g/l; in such case, the granular detergent compositions according to the present invention will contain a lower amount of "inorganic filler salt", compared to conventional granular detergents; typical filler salts are alkaline earth metal salts of sulphates and chlorides, typically sodium sulphate; "compact" detergents typically comprise not more than 10% filler salt. The liquid compositions according to the present invention can also be in "concentrated form", in such case, the liquid detergent compositions according to the present invention will contain a lower amount of water, compared to conventional liquid detergents. Typically, the water content of the concentrated liquid detergent is less than 30%, more preferably less than 20%, most preferably less than 10% by weight of the detergent compositions.

The process of the invention is conveniently carried out in the course of a laundering or washing process. The laundering or washing process is preferably carried out at about 5° C. to about 75° C., more preferably, from about 20° C. to about 60° C., but the functionalized polyamines are effective at up to about 100° C.

The functionalized polyamines of this invention inhibit dye transfer and provide color protection in detergent formulations. The functionalized polyamines do not interfere with the removal of stains from fabrics washed in the presence of the functionalized polyamine. The functionalized polyamines are compatible in liquid detergent formulations. In addition, the functionalized polyamines of this invention inhibit dye transfer and provide color protection in fabric softener formulations.

The following nonlimiting examples illustrate further aspects of the invention.

EXAMPLE 1

Preparation of a Homopolymer of Hexamethylene Diamine

In a 250 mL three neck reactor flask, 49.8 grams (0.3 moles) of 70% active hexamethylene diamine was added. The reactor was fitted with a condenser, thermocouple, temperature controller, and overhead stirrer. Deionized water, 100 grams, was added to the reactor and stirring was begun. Concentrated hydrochloric acid, 29.19 grams (0.3 moles) was added to the reactor by means of a 25 mL addition funnel while the temperature was maintained at or less than 32° C. with the assistance of an ice bath under the reactor. The reactor was fitted with a Dean-Stark trap and heating mantle and the temperature was increased to 115° C. and further increased in increments of 10° C. until all of the water was removed. As water was removed, ammonia evolved creating a melt and forming a homopolymer of hexamethylenediamine. After the water removal, the reaction was held at 160° C. for two hours, then the product was cooled and diluted with deionized water to desired concentration.

EXAMPLE 2

Preparation of a Homopolymer of 2-methylpentamethylenediamine

In a 250 mL three neck reactor flask, 35.3 grams (0.3 moles) of 2-methylpentamethylenediamine was added. The reactor was fitted with a condenser, thermocouple, temperature controller, and overhead stirrer. Deionized water, 100 grams, was added to the reactor and stirring was begun. Concentrated hydrochloric acid, 29.19 grams (0.3 moles) was added to the reactor by means of a 25 mL addition funnel while the temperature was maintained at or less than 32° C. with the assistance of an ice bath under the reactor. The reactor was fitted with a Dean-Stark trap and heating mantle and the temperature was increased to 115° C. and further increased in increments of 10° C. until all of the water was removed. As water was removed, ammonia evolved creating a melt and forming a homopolymer of 2-methylpentamethylenediamine. After the water removal, the reaction was held at 160° C. for two hours, then the product was cooled and diluted with deionized water to desired concentration.

EXAMPLE 3

Preparation of a Biguanide Functionalized Polyamine by a Batch Process Using Hexamethylenediamine, Sodium Dicyanamide, and Hydrochloric Acid In a 250 mL three neck reactor flask, 49.8 grams (0.3 moles) of 70% active hexamethylene diamine was added. The reactor was fitted with a condenser, thermocouple, temperature controller, and overhead stirrer. Deionized water, 100 grams, was added to the reactor and stirring was begun. Concentrated hydrochloric acid, 53.54 grams (0.55 moles) was added to the reactor by means of a 50 mL addition funnel while the temperature was maintained at or less than 32° C. with the assistance of an ice bath under the reactor.

Following the addition of hydrochloric acid, 13.9 grams (0.15 moles) of sodium dicyanamide was added. The reactor was fitted with a Dean-Stark trap and heating mantle and the temperature was increased to 115° C. and further increased in increments of 10° C. until all of the water was removed. As water was removed, ammonia evolved creating a melt and forming a resin. The resin was heated at 160° C. for two hours. Water, 127 grams, was added to the reactor to make a 35% resin solution. The pH of the solution was determined to be about 9 to 10.

EXAMPLE 4

Preparation of Biguanide Functionalized Polyamine by Stepwise Process Using Hexamethylenediamine, Sodium Dicyanamide, and Hydrochloric Acid In a 250 mL three neck reactor flask, 49.8 grams (0.3 moles) of 70% active hexamethylene diamine was added. The reactor was fitted with a condenser, thermocouple, temperature controller, and overhead stirrer. Deionized water, 100 grams, was added to the reactor and stirring was begun. Concentrated hydrochloric acid, 29.19 grams (0.3 moles) was added to the reactor by means of a 25 mL addition funnel while the temperature was maintained at or less than 32° C. with the assistance of an ice bath under the reactor. The reactor was fitted with a Dean-Stark trap and heating mantle and the temperature was increased to 115° C. and further increased in increments of 10° C. until all of the water was removed. As water was removed, ammonia evolved creating a melt and forming a polyamine resin. After the water removal, the reaction was held at 160° C. for two hours.

After the two-hour cook period, the reaction was cooled to 60° C. Concentrated hydrochloric acid, 17.50 grams (0.18 moles), and sodium dicyanamide, 13.9 grams (0.15 moles) were added and the reaction was subsequently heated to 160° C. for two hours to form a biguanidine functionalized polyamine. The appearance of the biguanidine functionalized polyamine was a homogenous translucent viscous substance. Water, 123 grams, was added to the reactor to make a 35% resin solution. The pH of the solution was determined to be about 12 and hydrochloric acid was added to the solution to bring the pH to 9 and 10.

EXAMPLE 5

Preparation of a Biguanidine Functionalized Polyamine by a Stepwise Process Using Hexamethylenediamine, Sodium Dicyanamide, and Hydrochloric Acid In a 250 mL three neck reactor flask, 49.8 grams (0.3 moles) of 70% aqueous hexamethylene diamine was added.

The reactor was fitted with a condenser, thermocouple, temperature controller, and overhead stirrer. Deionized water, 100 grams, was added to the reactor and stirring was begun. Concentrated hydrochloric acid, 29.19 grams, (0.3 moles) was added to the reactor by means of a 25 mL addition funnel while the temperature was maintained at or less than 32° C. with the assistance of an ice bath under the reactor. After the addition of the hydrochloric acid, the reactor was equipped with a Dean-Stark trap and heating mantle and the temperature was increased to 115° C. and further increased in increments of 10° C. until all of the water was removed. As water was removed, ammonia evolved creating a melt and forming a resin. After removing the water, the temperature was increased to 160° C. for two hours.

After the two-hour cook period, the reaction was cooled to 60° C. and dicyandiamide, 12.73 grams, (0.15 moles) was added to the reactor. The reaction temperature was raised to 160° C. for an additional two hours to form a biguanidine functionalized polyamine. The appearance of the biguanidine functionalized polyamine was a homogenous translucent viscous substance. Water, 108 grams, was added to the reactor to make a 35% solution. The pH of the solution was determined to be about 9 and 10.

EXAMPLE 6

Preparation of a Biguanidine Functionalized Polyamine by a Batch Process Using 2-methylpentamethylene Diamine, Sodium Dicyanamide, and Hydrochloric Acid In a 250 mL three neck reactor flask, 35.22 grams (0.3 moles) of 2-methyl pentamethylene diamine was added. The reactor was fitted with a condenser, thermocouple, temperature controller, and overhead stirrer. Deionized water, 100 grams, was added to the reactor and stirring was begun. Concentrated hydrochloric acid, 53.52 grams, (0.55 moles) was added to the reactor by means of a 50 mL addition funnel while the temperature was maintained at or less than 32° C. with the assistance of an ice bath under the reactor.

After the addition of the hydrochloric acid, 9.27 grams, (0.1 mole) of sodium dicyanamide was added to the reactor. The reactor was equipped with a Dean-Stark trap and heating mantle and the temperature was increased to 115° C. and further increased in increments of 10° C. until all of the water was removed. As water was removed, ammonia evolved creating a melt and forming a biguanidine functionalized polyamine. The temperature of the reactor was increased to 160° C. for two hours. Water, 120 grams, was added to the reactor to make a 35% solution. The pH of the solution was determined to be about 9 and 10.

EXAMPLE 7

Preparation of a Biguanidine Functionalized Polyamine by a Batch Process Using 2-methylpentamethylene Diamine, Dicyandiamide, and Hydrochloric Acid In a 250 mL three neck reactor flask, 35.22 grams (0.3 moles) of 2-methyl pentamethylene diamine was added. The reactor was fitted with a condenser, thermocouple, temperature controller, and overhead stirrer. Deionized water, 100 grams, was added to the reactor and stirring was begun. Concentrated hydrochloric acid, 53.52 grams, (0.55 moles) was added to the reactor by means of a 50 mL addition funnel while the temperature was maintained at or less than 32° C. with the assistance of an ice bath under the reactor.

After the addition of the hydrochloric acid, 25.50 grams (0.3 moles) of dicyandiamide was added to the reactor. The reactor was equipped with a Dean-Stark trap and heating mantle and the temperature was increased to 115° C. and further increased in increments of 10° C. until all of the water was removed. As water was removed, ammonia evolved creating a melt and forming a biguanidine functionalized polyamine. The temperature of the reactor was increased to 160° C. for two hours. Water, 150 grams, was added to the reactor to make a 35% solution. The pH of the solution was determined to be about 9 and 10.

EXAMPLE 8

Preparation of a Biguanidine Functionalized Polyamine by a Batch Process Using Hexamethylenediamine, Dicyandiamide, and Hydrochloric Acid In a 250 mL three neck reactor flask, 49.8 grams (0.3 moles) of 70% hexamethylenediamine was added. The reactor was fitted with a condenser, thermocouple, temperature controller, and overhead stirrer. Deionized water, 100 grams, was added to the reactor and stirring was begun. Concentrated hydrochloric acid, 53.24 grams, (0.6 moles) was added to the reactor by means of a 50 mL addition funnel while the temperature was maintained at or less than 32° C. with the assistance of an ice bath under the reactor.

After the addition of the hydrochloric acid, 51.00 grams (0.6 moles) of dicyandiamide was added to the reactor. The reactor was equipped with a Dean-Stark trap and heating mantle and the temperature was increased to 115° C. and further increased in increments of 10° C. until all of the water was removed. As water was removed, ammonia evolved creating a melt and forming a biguanidine functionalized polyamine. The temperature of the reactor was increased to 160° C. for two hours. Water, 196 grams, was added to the reactor to make a 35% solution. The pH of the solution was determined to be between 9 and 10.

EXAMPLE 9

Preparation of a Biguanidine Functionalized Polyamine by a Batch Process Using Hexamethylenediamine, Sodium Dicyanamide, and Sulfuric Acid In a 250 mL three neck reactor flask, 49.8 grams (0.3 moles) of 70% active hexamethylene diamine was added. The reactor was fitted with a condenser, thermocouple, temperature controller, and overhead stirrer. Deionized water, 100 grams, was added to the reactor and stirring was begun. Concentrated sulfuric acid, 11.0 grams (0.11 moles) was added to the reactor by means of a 25 mL addition funnel while the temperature was maintained at or less than 32° C. with the assistance of an ice bath under the reactor.

Following the addition of sulfuric acid, 9.27 grams (0.10 moles) of sodium dicyanamide was added. The reactor was fitted with a Dean-Stark trap and heating mantle and the temperature was increased to 115° C. and further increased in increments of 10° C. until all of the water was removed. As water was removed, ammonia evolved creating a melt and forming a resin. The resin was heated at 160° C. for two hours. Alternatively, the resin may be heated at 140° C. for six hours. Water, 102 grams, was added to the reactor to make a 35% resin solution. The pH of the solution was adjusted to between 9 and 10.

EXAMPLE 10

Preparation of a Biguanidine Functionalized Polyamine by a Batch Process Using Hexamethylenediamine, Dicyandiamide, and Sulfuric Acid In a 250 mL three neck reactor flask, 49.8 grams (0.3 moles) of 70% hexamethylenediamine was added. The reactor was fitted with a condenser, thermocouple, temperature controller, and overhead stirrer. Deionized water, 100 grams, was added to the reactor and stirring was begun. Concentrated sulfuric acid, 11.0 grams, (0.11 moles) was added to the reactor by means of a 25 mL addition funnel while the temperature was maintained at or less than 32° C. with the assistance of an ice bath under the reactor.

After the addition of the sulfuric acid, 8.41 grams (0.1 moles) of dicyandiamide was added to the reactor. The reactor was equipped with a Dean-Stark trap and heating mantle and the temperature was increased to 115° C. and further increased in increments of 10° C. until all of the water was removed. As water was removed, ammonia evolved creating a melt and forming a biguanidine functionalized polyamine. The temperature of the reactor was increased to 160° C. for two hours. Alternatively the reaction may be heated to 140° C. for six hours. Water, 101 grams, was added to the reactor to make a 35% solution. The pH of the solution was adjusted to between 9 and 10.

EXAMPLE 11

Preparation of a Biguanidine Functionalized Polyamine by a Batch Process Using 2-methylpentamethylene Diamine, Sodium Dicyanamide, and Sulfuric Acid In a 250 mL three neck reactor flask, 35.22 grams (0.3 moles) of 2-methyl pentamethylene diamine was added. The reactor was fitted with a condenser, thermocouple, temperature controller, and overhead stirrer. Deionized water, 100 grams, was added to the reactor and stirring was begun. Concentrated sulfuric acid, 11.0 grams, (0.11 moles) was added to the reactor by means of a 25 mL addition funnel while the temperature was maintained at or less than 32° C. with the assistance of an ice bath under the reactor.

After the addition of the sulfuric acid, 9.27 grams, (0.1 mole) of sodium dicyanamide was added to the reactor. The reactor was equipped with a Dean-Stark trap and heating mantle and the temperature was increased to 115° C. and further increased in increments of 10° C. until all of the water was removed. As water was removed, ammonia evolved creating a melt and forming a biguanidine functionalized polyamine. The temperature of the reactor was increased to 160° C. for two hours. Water, 102 grams, was added to the reactor to make a 35% solution. The pH of the solution was adjusted to between 9 and 10.

EXAMPLE 12

Preparation of a Biguanidine Functionalized Polyamine by a Batch Process Using 2-methylpentamethylene, Dicyandiamide, and Sulfuric Acid In a 250 mL three neck reactor flask, 35.22 grams (0.3 moles) of 2-methylpentamethylene diamine was added. The reactor was fitted with a condenser, thermocouple, temperature controller, and overhead stirrer. Deionized water, 100 grams, was added to the reactor and stirring was begun. Concentrated sulfuric acid, 29.42 grams, (0.3 moles) was added to the reactor by means of a 25 mL addition funnel while the temperature was maintained at or less than 32° C. with the assistance of an ice bath under the reactor.

After the addition of the sulfuric acid, 25.50 grams (0.3 moles) of dicyandiamide was added to the reactor. The reactor was equipped with a Dean-Stark trap and heating mantle and the temperature was increased to 115° C. and further increased in increments of 10° C. until all of the water was removed. As water was removed, ammonia evolved creating a melt and forming a biguanidine functionalized polyamine. The temperature of the reactor was increased to 160° C. for two hours. Alternatively the reaction may be heated to 140° C. for six hours. Water, 167 grams, was added to the reactor to make a 35% solution. The pH of the solution was adjusted to between 9 and 10.

EXAMPLE 13

Compatibility of Polymers in Liquid Detergent Formulations

The following is based on weight %.

22.5% Neodol 25-7 (available from Shell Chemical)
18.75% Biosoft D-40 (available from Stepan Company)
3.0% Triethanolamine (TEA)
5.0% Ethanol
2.0% Potassium Chloride (KCl)
1.0% Polymer
47.75% Water The Unbuilt liquid detergent listed above was formulated in the following manner. While maintaining good agitation add KCl to water. Next add the TEA and the ethanol. Add Biosoft D-40. Slowly add Neodol and then the polymer. Stir until homogenous. The test results are summarized in Table I.

TABLE I

| Polymer | Compatibility in Liquid formulation |
| --- | --- |
| Example 6 | 1 phase |
| Example 7 | 1 phase |

EXAMPLE 14

Anti-dye Properties in Detergent Formulations

The polymers prepared in Examples 4, 6 and 7 were tested for anti-dye transfer properties in a series of commercial and experimental detergent formulations. The test consisted on washing 1 white cotton swatch with 4 swatches dyed with Direct Blue 1 and 4 swatches dyed with Direct Blue 90. These swatches are commercially available from Test Fabrics in New Jersey. The test was conducted in a terg-o-tometer using 1.9 g/l of detergent and 5.0 weight polymer. The test was conducted at 93° F., 80 rpm and 110 ppm hardness water. The wash was 20 minutes and was followed by a 3 minute rinse. The swatches were then dried and the L values of the white swatches were measured using a Minolta colorimeter. A higher L value for the white swatch indicate that less dye is being transferred to the swatch and is a measure of the effectiveness of the dye transfer polymer.

The test results are summarized in Table II.

TABLE II

| Polymer | L value of white swatch in Arm and Hammer powder | L value of white swatch in Arm and Hammer Liquid | L value of white swatch in the Unbuilt liquid detergent of Ex 13 | L value of white Swatch in Greencare powder | L value of white swatch in Amway liquid | L value of white swatch in Ajax liquid |
|---|---|---|---|---|---|---|
| None | 73.7 | 77.9 | 75.7 | 76.2 | 78.9 | 74.6 |
| Example 6 | 78.8 | 89.0 | 86.1 | 88.9 | 87.5 | 84.7 |
| Example 7 | 78.7 | 88.5 | 83.8 | 88.4 | 85.6 | 85.4 |
| Example 4 | 89.5 | 91.7 | 91.4 | 92.4 | — | — |

The test results in Table II show that the polymers prepared in Examples 4, 6 and 7 are excellent anti-dye transfer agents in the detergent formulations evaluated.

EXAMPLE 15

Color Protection, Anti-dye Transfer Properties and Detergency of Polymers of this Invention The polymers prepared in Examples 4, 6 and 7 were tested for anti-dye transfer properties in a commercial detergent formulation. The test consisted on washing 1 white cotton swatch with 4 swatches dyed with Direct Blue 1 and 4 swatches dyed with Direct Blue 90. These swatches are commercially available from Test Fabrics in New Jersey. The test was conducted in a terg-o-tometer using 1.9 g/l of detergent (commercial Arm and Hammer powder) and 5.0 weight polymer. The test was conducted at 93° F., 80 rpm and 110 ppm hardness water. The wash was 20 minutes and was followed by a 3 minute rinse. The swatches were then dried and the L values of the white swatches were measured using a Minolta colorimeter. A higher L value for the white swatch indicate that less dye is being transferred to the swatch and is a measure of the effectiveness of the dye transfer polymer. A lower value for the Direct Blue 1 swatch indicates that the dye is being retained on the colored fabric.

A primary detergency test was conducted using a Blood/Milk/Ink (EMPA 116 or BMI) stain that was obtained from Test Fabrics. The test consisted on washing a BMI obtained swatch with 9 white swatches as ballast. These swatches are commercially available from Test Fabrics in New Jersey. The test was conducted in a terg-o-tometer using 1.9 g/l of detergent (commercial Arm and Hammer powder) and 5.0 wt. polymer. The test was conducted at 93° F., 80 rpm and 110 ppm hardness water. The wash was 20 minutes and was followed by a 3 minute rinse. The swatches were then dried and the L values of the BMI swatches were measured using a Minolta calorimeter. Higher L values for the BMI swatches indicate better detergency and that the stain is not being held on. The test results are summarized in Table III.

TABLE III

| Polymer | L value of white swatch in anti-dye transfer | L value of Direct Blue 1 swatch in anti-dye transfer | L value of BMI swatch in primary detergency |
|---|---|---|---|
| None | 74.0 | 39.9 | 61.8 |
| Example 4 | 90.4 | 37.7 | 63.5 |

The test results in Table III show that the polymer prepared in Example 4 has anti-dye transfer properties. More importantly the polymer of Example 4 helps keep the dyes on the Direct Blue 1 swatch since the L value for this swatch is lower than that of the control. Furthermore, the polymer does not adversely affect stain removal since the L value of the BMI swatch in the presence of the polymer is at least equal to or greater than that of the control.

EXAMPLE 16

Comparison of the Anti-dye Transfer and Color Protection Properties with that of a Commercial Anti-dye Transfer Polymer The performance of the polymer prepared in Example 4 was compared to that of a commercial anti-dye transfer polymer. The commercial anti-dye transfer polymer is polyvinyl pyrrolidone (PVP) and is commercially available as Sokolan HP-50 from BASF. The test was conducted in powder Arm and Hammer. The test used 4 Direct Blue 90 swatches, 4 Direct Blue 1 swatches and 1 white Cotton 400 swatch. The detergent was dosed at 0.9 g/l and the test was conducted in a terg-o-tometer at 93° F., 80 rpm and 110 ppm hardness water. The test results are summarized in Table IV.

TABLE IV

| Polymer | Weight percent polymer based on weight of total detergent | L value for white swatch | L value for Direct Blue 1 swatch |
|---|---|---|---|
| None | — | 75.2 | 39.4 |
| PVP | 1.0 | 78.4 | 39.5 |
| Example 4 | 1.0 | 79.8 | 38.7 |
| PVP | 2.0 | 80.2 | 38.9 |
| Example 4 | 2.0 | 85.7 | 38.5 |

The test results in Table IV show that the polymer prepared in Example 4 has superior anti-dye and color protection properties to PVP when compared at identical levels of polymer in a commercial detergent formulation.

EXAMPLE 17

Comparative Anti-dye Transfer Properties of Various Polymers and the Polyamine of Example 2 in a Liquid Detergent Formulation The polymers prepared in Examples 7, 9, 10, 11 and 12 were tested for anti-dye transfer properties in commercial Liquid Arm and Hammer and compared to that of the polyamine of Example 2. The test consisted on washing 1 white cotton swatch with 4 swatches dyed with Direct Blue 1 and 4 swatches dyed with Direct Blue 90. These swatches are commercially available from Test Fabrics in New Jersey. The test was conducted in a terg-o-tometer using 1.9 g/l of detergent and 5.0 wt. polymer. The test was conducted at 93° F., 80 rpm and 110 ppm hardness water. The wash was 20 minutes and was followed by a 3 minute rinse. The swatches were then dried and the L values of the white swatches were measured using a Minolta calorimeter. A higher L value for the white swatch indicate that less dye is being transferred to the swatch and is a measure of the effectiveness of the dye transfer polymer. The test results are summarized in Table V.

TABLE V

| Polymer | L value of white swatch |
|---|---|
| None | 76.2 |
| Example 2 | 76.8 |
| Example 7 | 86.2 |
| Example 9 | 90.8 |
| Example 10 | 88.8 |
| Example 11 | 90.5 |
| Example 12 | 83.5 |

The test results in Table V show that the polyamine prepared in Example 2 does not have any anti-dye transfer properties. However, the functionalized polyamines of Examples 7, 9, 10, 11 and 12 have excellent anti-dye transfer properties when evaluated under identical experimental conditions.

EXAMPLE 18

Anti-dye Transfer in the Rinse (fabric softener)

The anti-dye transfer agent is added as an element of the fabric softener. For the purposes of experimentation the test was conducted with and without a commercial fabric softener (Downy) in the rinse. The fabric softener was dosed at 0.48 g/L. The anti-dye transfer polymers were added to the rinse at 5 weight percent of this amount based upon dry polymer. There was a 10 minute rinse in 110 ppm. hard water. The rinse included 4 Direct Blue 1, 4 Direct Blue 90, and 1 White cotton #400 swatch. The swatches were 4.5×6 in. This was followed by 10 to 15 minutes of drying in a commercial washer that was on the "Whites" setting. The dye transfer was evaluated by measuring the L values on a Minolta spectrophotometer. The test results are summarized in Table VI.

TABLE VI

| Sample | L value of white swatch without fabric softener | L value of white swatch with fabric softener Downy |
|---|---|---|
| Blank | 79.2 | 91.5 |
| Example 6 | 90.3 | 92.2 |
| Example 4 | 91.5 | 92.9 |

The test results in Table VI show that the polymers prepared in Examples 4 and 6 have anti-dye transfer benefit in the rinse cycle both with and without a commercial fabric softener.

While the invention has been described with particular reference to certain embodiments thereof, it will be understood that changes and modifications may be made by those of ordinary skill in the art within the scope and spirit of the following claims.

What is claimed is:

1. A laundry detergent composition comprising a functionalized polyamine and at least one ingredient selected from the group consisting of a builder, surfactant, enzyme, enzyme stabilizer, optical brightener, bleach, bleach activator, enzyme activator, suds suppresser, perfume, and filler salt, wherein said functionalized polyamine inhibits dye transfer and provides color protection in said detergent composition, wherein said functionalized polyamine comprises the reaction product of (A) a cyano- or guanidino-containing compound selected from the group consisting of cyanamides or salts thereof, dicyanamides or salts thereof, dicyandiamides or salts thereof, guanidines or salts thereof, biguanidines or salts thereof, and combinations thereof, and (B) a polyamine prepared from at least one monomeric amine, wherein the cyano- or guanidino-functional groups are attached to the polyamine or incorporated therein to form the functionalized polyamine, provided that the monomeric amine and the cyano- or guanidino-containing compound are present in the functionalized polyamine in a molar ratio of from 1.1:1 to 100:1, respectively, wherein the functionalized polyamine has the structure

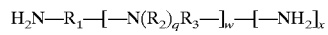

wherein $R_1$ is selected from the group consisting of $C_1$–$C_{20}$ alkyl, aryl, alkaryl, and —$(CH_2CHXO)_p$—; X is selected from the group consisting of hydrogen, methyl, ethyl, propyl, phenyl, OH, and OX'; X' is selected from the group consisting of $C_1$–$C_{20}$ alkyl, aryl, and alkaryl; $R_2$ is selected from the group consisting of hydrogen, $C_1$–$C_{20}$ alkyl, aryl, alkaryl, —$(CH_2CHXO)_p$—, —$R_7$—$[$—$N(R_8)_rR_9$—$]_y$—$[$—$NH_2]_z$, and —C≡NHY$_1$(NY$_2$Y$_3$)—; $R_3$ is selected from the group consisting of hydrogen, $C_1$–$C_{20}$ alkyl, aryl, alkaryl, —$(CH_2CHXO)_p$—, —$R_4R_5N$—$R_6$—, $R_{13}$—$[$—$N(R_{14})_s$ $R_{15}$—$]_a$—$[$—$NH_2]_b$, and —C≡NHY$_7$(NY$_8$Y$_9$)—; $R_4$ is selected from the group consisting of $C_1$–$C_4$ alkyl, alkoxy, and alkamine; $R_5$ is selected from the group consisting of $C_1$–$C_4$ alkyl, alkoxy, and alkamine; $R_6$ is selected from the group consisting of hydrogen, $C_1$–$C_{20}$ alkyl, aryl, alkaryl, and —$(CH_2CHXO)_p$—, and —C≡NHY$_7$(NY$_8$Y$_9$)—; $R_7$ is selected from the group consisting of $C_1$–$C_{20}$ alkyl alkaryl, and —$(CH_2CHXO)_p$—; $R_8$ is selected from the group consisting of hydrogen, $C_1$–$C_{20}$ alkyl, aryl, alkaryl, —$(CH_2CHXO)_p$—, and —C≡NHY$_1$(NY$_2$Y$_3$)—; $R_9$ is selected from the group consisting of hydrogen, $C_1$–$C_{20}$ alkyl, aryl, alkaryl, —$(CH_2CHXO)_p$—, —$R_{10}R_{11}N$—$R_{12}$—, and —C≡NHY$_7$(NY$_8$Y$_9$)—; $R_{10}$ is selected from the group consisting of $C_1$–$C_4$ alkyl, alkoxy, and alkamine; $R_{11}$ is selected from the group consisting of $C_1$–$C_4$ alkyl, alkoxy, and alkamine; $R_{12}$ is selected from the group consisting of hydrogen, $C_1$–$C_{20}$ alkyl, aryl, alkaryl, and —$(CH_2CHXO)_p$—, and —C≡NHY$_7$(NY$_8$Y$_9$)—; $R_{13}$ is selected from the group consisting of $C_1$–$C_{20}$ alkyl, aryl, alkaryl, and —$(CH_2CHXO)_p$—; $R_{14}$ is selected from the group consisting of hydrogen, $C_1$–$C_{20}$alkyl, aryl, alkaryl, —$(CH_2CHXO)_p$—, and —C≡NHY$_1$(NY$_2$Y$_3$)—; $R_{15}$ is selected from the group consisting of hydrogen, $C_1$–$C_{20}$ alkyl, aryl, alkaryl, —$(CH_2CHXO)_p$—, —$R_{16}R_{17}N$—$R_{18}$—, and —C≡NHY$_7$(NY$_8$Y$_9$)—; $R_{16}$ is selected from the group consisting of $C_1$–$C_4$ alkyl, alkoxy, and alkamine; $R_{17}$ is selected from the group consisting of $C_1$–$C_4$ alkyl, alkoxy, and alkamine; $R_{18}$ is selected from the group consisting of hydrogen, $C_1$–$C_{20}$ alkyl, aryl, alkaryl, and —$(CH_2CHXO)_p$—, and —C≡NHY$_7$(NY$_8$Y$_9$)—; $Y_1$ is a dissociated acid; $Y_2$ is selected from the group consisting of hydrogen, $C_1$–$C_{20}$ alkyl, aryl, alkaryl, and —$(CH_2CHXO)_p$—; $Y_3$ is selected from the group consisting of hydrogen, $C_1$–$C_{20}$ alkyl, aryl, alkaryl, —$(CH_2CHXO)_p$—, —C≡NHY$_4$(NY$_5$Y$_6$)—, and nitrile (—C≡≡≡N); $Y_4$ is a dissociated acid; $Y_5$ is selected from the group consisting of hydrogen, $C_1$–$C_{20}$ alkyl, aryl, alkaryl, and —$(CH_2CHXO)_p$—; $Y_6$ is selected from the group consisting of hydrogen, $C_1$–$C_{20}$ alkyl, aryl, alkaryl, and —$(CH_2CHXO)_p$—; $Y_7$ is a dissociated acid; $Y_8$ is selected from the group consisting of hydrogen, $C_1$–$C_{20}$ alkyl, aryl, alkaryl, and —$(CH_2CHXO)_p$—; $Y_9$ is selected from the group consisting of hydrogen, $C_1$–$C_{20}$ alkyl, aryl, alkaryl, —$(CH_2CHXO)_p$—, —C≡$NHY_{10}(NY_{11}Y_{12})$—, and nitrile (—C≡≡≡N); $Y_{10}$ is a dissociated acid; $Y_{11}$ is selected from the group consisting of hydrogen, $C_1$–$C_{20}$ alkyl, aryl, alkaryl, and —$(CH_2CHXO)_p$—; $Y_{12}$ is selected from the group consisting of hydrogen, $C_1$–$C_{20}$ alkyl, aryl, alkaryl, and —$(CH_2CHXO)_p$—; a is 1 to 5,000; b is 0 or 1; p is 1 to 6; q is 0 or 1; r is 0 or 1; s is 0 or 1; w is 1 to 5,000; x is 0 or 1; y is 1 to 5,000; z is 0 or 1; with the following provisos: if $R_2$ and $R_3$ are hydrogen, then x is 0; if $R_8$ and $R_9$ are hydrogen, then z is 0; if $R_{14}$ and $R_{15}$ are hydrogen, then b is 0; if q is 0, then $R_3$ is —$R_4R_5N$—$R_6$—; if r is 0, then $R_9$ is —$R_{10}R_{11}N$—$R_{12}$—; if s is 0, then $R_{15}$ is —$R_{16}R_{17}N$—$R_{18}$—; if $R_6$ is hydrogen, then x is 0; if $R_{12}$ is hydrogen, then z is 0; if $R_{18}$ is hydrogen, then b is 0; if $R_2$ is present, then $R_3$ is selected from the group consisting of $C_1$–$C_{20}$ alkyl, aryl, alkaryl, —$(CH_2CHXO)_p$—, $R_{13}$—[—$N(R_{14})_sR_{15}$—]$_a$—[—$NH_2$]$_b$, and —C≡$NHY_7(NY_8Y_9)$—; if $R_8$ is present, then $R_9$ is selected from the group consisting of $C_1$–$C_{20}$ alkyl, aryl, alkaryl, and —$(CH_2CHXO)_p$—, and —C≡$NHY_7(NY_8Y_9)$—; if $R_{14}$ is present, then $R_{15}$ is selected from the group consisting of $C_1$–$C_{20}$ alkyl, aryl, alkaryl, and —$(CH_2CHXO)_p$—, and —C≡$NHY_7(NY_8Y_9)$—; if $Y_8$ and $Y_9$ are hydrogen, then at least one of b, x, and z is 0; and if $Y_{11}$ and $Y_{12}$ are hydrogen, then at least one of b, x, and z is 0.

2. The laundry detergent composition according to claim 1 further comprising a protease enzyme.

3. The laundry detergent composition according to claim 1 wherein the functionalized polyamine is present in an amount of from about 0.01 to about 90 weight percent, based on the total weight of the detergent composition.

4. The laundry detergent composition according to claim 3 wherein the functionalized polyamine is present in an amount of from about 0.05 to about 20 weight percent.

5. The laundry detergent composition according to claim 3 wherein the functionalized polyamine is present in an amount of from about 0.1 to about 10 weight percent.

* * * * *